United States Patent
Jang

(10) Patent No.: US 11,637,329 B2
(45) Date of Patent: Apr. 25, 2023

(54) HIGH-ELASTICITY PHOSPHAZENE POLYMER FOR LITHIUM METAL PROTECTION, LITHIUM SECONDARY BATTERY AND MANUFACTURING METHOD

(71) Applicant: Global Graphene Group, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 127 days.

(21) Appl. No.: 17/170,283

(22) Filed: Feb. 8, 2021

(65) Prior Publication Data

US 2022/0255147 A1  Aug. 11, 2022

(51) Int. Cl.
| | |
|---|---|
| *H01M 10/42* | (2006.01) |
| *H01M 4/62* | (2006.01) |
| *H01M 50/414* | (2021.01) |
| *H01M 50/489* | (2021.01) |
| *H01M 10/052* | (2010.01) |
| *H01M 10/0525* | (2010.01) |
| *H01M 10/058* | (2010.01) |
| *H01M 4/134* | (2010.01) |
| *H01M 10/0562* | (2010.01) |
| *H01M 4/02* | (2006.01) |

(52) U.S. Cl.
CPC ....... *H01M 10/4235* (2013.01); *H01M 4/134* (2013.01); *H01M 4/628* (2013.01); *H01M 10/052* (2013.01); *H01M 10/058* (2013.01); *H01M 10/0525* (2013.01); *H01M 10/0562* (2013.01); *H01M 50/414* (2021.01); *H01M 50/489* (2021.01); *H01M 2004/027* (2013.01); *H01M 2300/0034* (2013.01); *H01M 2300/0037* (2013.01); *H01M 2300/0071* (2013.01); *H01M 2300/0091* (2013.01)

(58) Field of Classification Search
None
See application file for complete search history.

(56) References Cited

U.S. PATENT DOCUMENTS

| | | |
|---|---|---|
| 5,434,021 A | 7/1995 | Fauteux et al. |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 2002/0127467 A1* | 9/2002 | Watanabe ........... H01M 50/186 29/623.2 |
| 2007/0059600 A1 | 3/2007 | Kim et al. |
| 2013/0196223 A1* | 8/2013 | Gering ................ H01M 4/0419 427/78 |
| 2016/0181585 A1 | 6/2016 | Choi et al. |
| 2018/0301707 A1 | 10/2018 | Pan et al. |
| 2019/0372148 A1* | 12/2019 | He ..................... H01M 10/052 |

FOREIGN PATENT DOCUMENTS

EP       0 284 103 A2 *  9/1988

OTHER PUBLICATIONS

Tavorite, available online at https://www.mindat.org/min-3896.html, date unknown.*
U.S. Appl. No. 15/954,046 Nonfinal Office Action dated Nov. 20, 2020, 10 pages.
U.S. Appl. No. 16/166,536 Final Office Action dated Nov. 18, 2020, 7 pages.
U.S. Appl. No. 16/256,346 Final Office Action dated Dec. 8, 2020, 18 pages.

* cited by examiner

*Primary Examiner* — Anca Eoff

(57) ABSTRACT

A lithium secondary battery comprising a cathode, an anode, and an elastic polymer protective layer disposed between the cathode and the anode, and a working electrolyte in ionic communication with the anode and the cathode, wherein the elastic polymer protective layer comprises a high-elasticity polymer having a thickness from 2 nm to 200 μm, a lithium ion conductivity from $10^{-8}$ S/cm to $5 \times 10^{-2}$ S/cm at room temperature, and a fully recoverable tensile elastic strain of at least 5% when measured without any additive or filler dispersed therein and wherein the high-elasticity polymer comprises a crosslinked polymer network of chains derived from a phosphazene compound and wherein the crosslinked polymer network of chains is impregnated with from 0% to 90% by weight of a liquid electrolyte.

40 Claims, 3 Drawing Sheets

Flame retardant additive uniformly distributed in an elastic, ion-conducting polymer matrix High flame retardant additive concentration at one side of an elastic, ion-conducting polymer and flame retardant composite separator This side has a low concentration of flame retardant additive

HIGH-ELASTICITY PHOSPHAZENE POLYMER FOR LITHIUM METAL PROTECTION, LITHIUM SECONDARY BATTERY AND MANUFACTURING METHOD

FIELD

The present disclosure relates to the field of rechargeable lithium battery, including the lithium-ion battery and the lithium metal battery (a secondary battery that makes use of lithium metal as an anode active material) and a method of manufacturing same.

BACKGROUND

Lithium-ion and lithium (Li) metal cells (including Lithium-sulfur cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium-ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir, et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI$—$Li_3PO_4$—$P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and another electrolyte) does not have and cannot maintain a good contact with the lithium metal. This significantly reduces the effectiveness of the electrolyte to support dissolution of lithium ions (during battery discharge), transport lithium ions, and allowing the lithium ions to re-deposit back to the lithium anode (during battery recharge). A ceramic separator that is disposed between an anode active material layer (e.g. a graphite-based anode layer or a lithium metal layer) and a cathode active layer suffers from the same problems as well. In addition, a ceramic separator also has a poor contact with the cathode layer if the electrolyte in the cathode layer is a solid electrolyte (e.g., inorganic solid electrolyte).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier to implement approach to preventing Li metal dendrite-induced internal short circuit and thermal runaway problems in Li metal batteries, and to reducing or eliminating the detrimental reactions between lithium metal and the electrolyte.

Hence, an object of the present disclosure was to provide a multi-functional separator or an anode-protecting layer to overcome the lithium metal dendrite formation and penetration problems and to prevent continuous electrolyte-lithium reactions in all types of Li metal batteries having a lithium metal anode. A specific object of the present disclosure was to provide a lithium metal cell or a lithium-ion cell that exhibits a safe, high specific capacity, high specific energy, high degree of safety, and a long and stable cycle life.

SUMMARY

The present disclosure provides a lithium secondary battery comprising a cathode, an anode, an elastic, ion-conducting polymer layer (herein referred to as an "elastic polymer protective layer," acting as an anode-protecting layer and/or a separator (or ion-conducting membrane) disposed between the cathode and the anode, and a working electrolyte through which lithium ions are transported between the anode and the cathode during the battery charging or discharging step, wherein the elastic and ion-conducting polymer layer comprises a high-elasticity polymer having a thickness from 2 nm to 200 μm (preferably from 10 nm to 20 μm), a lithium ion conductivity from $10^{-8}$ S/cm to $5 \times 10^{-2}$ S/cm at room temperature, and a fully recoverable elastic tensile strain greater than 5% (preferably from 10% to 500%) and further preferably from 30% to 300%) when measured without any additive dispersed therein. The high-elasticity polymer comprises at least a crosslinked polymer network of chains derived from at least a phosphazene compound and wherein said crosslinked polymer network of chains is impregnated with from 0% to 90% by weight of a lithium salt, a non-aqueous liquid solvent, or a liquid electrolyte comprising a lithium salt dissolved in a non-aqueous liquid solvent. This liquid electrolyte can be the same as or different from the working electrolyte in the cell.

In certain embodiments, the battery has one or more of the following characteristics: (i) the battery is a lithium metal battery and the anode has an anode current collector but initially the anode has no lithium or lithium alloy as an anode active material supported by said anode current collector when the battery is made and prior to a charge or discharge operation of the battery; (ii) the high-elasticity polymer layer serves as a separator and there is no additional separator in the battery; or (iii) the high-elasticity polymer further comprises a flame-retardant additive or particles of an inorganic solid electrolyte.

In some embodiments, the lithium secondary battery further comprises an ion-conducting and electrically insulating separator disposed between the elastic polymer protective layer and the cathode.

Polyphosphazenes, also commonly referred to as poly(organo)phosphazenes, are a family of inorganic molecular hybrid polymers based on a phosphorus-nitrogen backbone substituted with organic side groups which show a broad array of unique properties due to the vast array of organic substituents possible.

The method of synthesizing polyphosphazenes depends on the desired type of polyphosphazene. A wide variety of reactive phosphazene compounds are available as a potential reactive precursor material (monomer, oligomer, or reactive polymer). In the present specification, a reactive phosphazene compound can mean a monomer, oligomer, or reactive polymer that can be chemically reacted (i.e., can undergo polymerization, including copolymerization, functional group substitution, such as replacing Cl— with an organic or organometallic group, and/or crosslinking). A curing agent refers to an initiator, catalyst, substituent (e.g., an organic or organometallic group), and/or a crosslinking agent that enables the desired chemical reaction (polymerization, substitution, and/or crosslinking).

The most widely used method for linear phosphazene polymers is based on a two-step process. In the first step, as an example, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

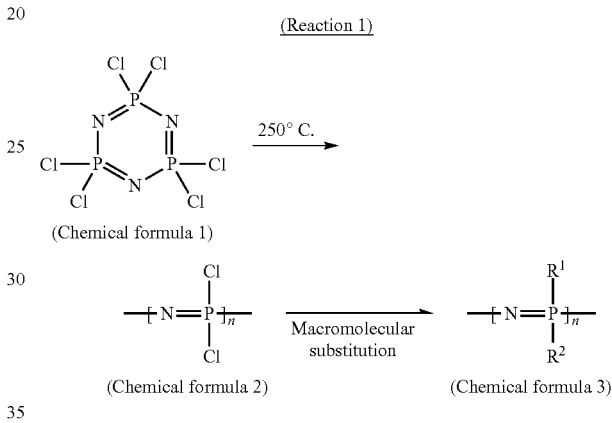

In the second step the chlorine atoms linked to phosphorus in the polymer are replaced by organic groups through reactions with $R^1$ or $R^2$ to form Chemical formula 3, where $R^1$ and $R^2$ are organic or organometallic groups (there is no particular restriction on the types of organic or organometallic groups that can be chosen). Preferably, $R^1$ and $R^2$ may be independently selected from alkoxides, aryloxides, amines, or organometallic groups, etc. Many different reagents (or called substituting agents or, simply "substituents") can be used in this macromolecular substitution reaction and, hence, a large number of different polymers can be produced. All these polymers are herein referred to as a polyphosphazene. Some examples of the macromolecular substitution are shown below (Reactions 2a, 2b, and 2c):

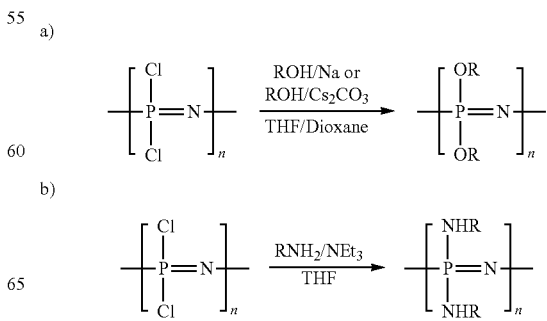

-continued c)
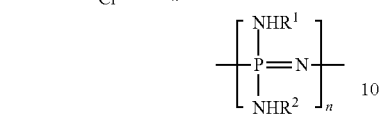

Polyphosphazene polymers include a wide range of hybrid inorganic-organic polymers with a number of different skeletal architectures that has the backbone —P—N—P—N—P—N—. In nearly all of these materials, two organic side groups are attached to each phosphorus center. Examples of phosphazene polymers include the following:
  a) Linear polymers have the formula $(N=PR^1R^2)_n$, where $R^1$ and $R^2$ are organic;
  b) Cyclolinear and cyclomatrix polymers in which small phosphazene rings are connected together by organic chain units.
  c) Block copolymer, star, dendritic, or comb-type structures.

More than 700 different polyphosphazenes are known, with different side groups (R) and different molecular architectures.

For discussion purposes, polyphosphazenes may be conveniently divided into two major classes-those in which the side groups are attached to phosphorus via oxygen (P—OR) or nitrogen (P—NR$_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

In certain embodiments, the polymer comprises a polyphosphazene selected from the groups consisting of (a) linear polymers having the formula $(N=PR^1R^2)_n$, where $R^1$ and $R^2$ are organic; (b) cyclolinear and cyclomatrix polymers in which small phosphazene rings are connected together by organic chain units; (c) block copolymer, star, dendritic, or comb-type structures; and combinations thereof.

In certain embodiments, the phosphazene compound is synthesized from a precursor monomer, oligomer, or reactive polymer selected from Chemical formula 1, Chemical formula 2, Chemical formula 3, Chemical formula 4, or a combination thereof:

(Chemical formula 1)
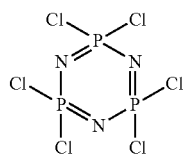

(Chemical formula 2)
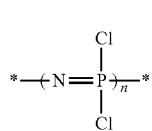

(Chemical formula 3)
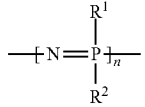

(Chemical formula 4)
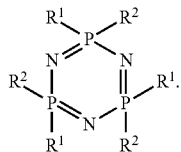

wherein R, $R^1$ and $R^2$ are independently selected from an organic group or an organometallic group.

The optional liquid electrolyte typically comprises a lithium salt dissolved in a non-aqueous solvent (e.g., an organic liquid solvent or an ionic liquid). The lithium salt concentration in the liquid electrolyte solution may be from 0.1 M to 20 M, preferably greater than 1.5 M, more preferably greater than 2.0 M, further more preferably greater than 3.0 M. The total liquid solvent proportion in the elastic polymer protective layer is preferably less than 90% by weight, more preferably less than 50%, further preferably less than 20%, still more preferably less than 10% and most preferably less than 5% by weight.

In certain embodiments, the high-elasticity polymer contains a cross-linked network of a phosphazene compound crosslinked by a crosslinking agent to a degree of crosslinking that imparts an elastic tensile strain from 5% to 500%.

The crosslinking agent may be selected from poiy(diethanol) diacrylate, poly(ethyleneglycol)dimethacrylate, poly(diethanol) dimethylacrylate, poly(ethylene glycol) diacrylate, N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, N,N'- Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

The polyphosphazene may be crosslinked by a crosslinking agent that comprises a compound having at least one reactive group selected from a phenylene group, a hydroxyl group, an amino group, an imino group, an amide group, an acrylic amide group, an amine group, an acrylic group, an acrylic ester group, or a mercapto group in the molecule.

In a typical configuration, this elastic polymer protective layer is in ionic contact with both the anode and the cathode and typically in physical contact with an anode active material layer (or an anode current collector) and with a cathode active material layer.

In some embodiments, with this multi-functional elastic polymer protective layer, there is no need to have a separate or additional separator or anode-protecting layer in the battery cell. This multi-functional layer serves not only as a separator that electrically isolates the anode from the cathode but also a lithium metal protection layer (in the cases where lithium metal is the primary anode active material). This layer is elastic, enabling good ionic contact between an anode active layer (or anode current collector) and a cathode active layer, thereby significantly reducing the interfacial impedance.

Alternatively, the lithium secondary battery may further comprise an ion-conducting and electrically insulating separator disposed between the elastic polymer protective layer and the cathode. This separator can be selected from a polymer, ceramic, fibrous, glass, or composite type ion permeable membrane. This high-elasticity polymer enables a good ionic contact between the separator layer and the anode.

In certain embodiments, the anode in the lithium secondary battery has an amount of lithium or lithium alloy as an anode active material supported by an anode current collector.

In certain other embodiments, initially the anode has no lithium or lithium alloy as an anode active material supported by the anode current collector when the battery is made and prior to a charge or discharge operation of the battery. The needed lithium ions are pre-stored in the cathode active material when the battery is made. This configuration is referred to as an anode-less lithium battery.

In certain embodiments, the battery is a lithium-ion battery and the anode has an anode current collector and a layer of an anode active material supported by the anode current collector, which is in physical contact with the elastic flame-retardant composite separator. The anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

The anode current collector may be selected from, for instance, a Cu foil, a Cu-coated polymer film, a sheet of Ni foam, a porous layer of nano-filaments, such as graphene sheets, carbon nanofibers, carbon nano-tubes, etc.

In some embodiments, the cathode comprises particles of a cathode active material and a conductive additive that are dispersed in or bonded by a high-elasticity polymer, which serves as a solid-state electrolyte. This high-elasticity polymer electrolyte in the cathode may comprise at least a crosslinked polymer network of chains derived from at least one phosphazene compound.

This elastic protective polymer layer may also act to provide flame-retardant or fire-resisting capability to the battery since phosphazene compound can prevent the anode from initiating a thermal runaway problem. One may choose to add an additional amount of from 0.1% to 70% (preferably from 10% to 50%) by weight of a flame retardant that is dispersed in, dissolved in, or chemically bonded to the high-elasticity polymer. Preferably, the flame retardant additive is selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

In certain embodiments, the elastic polymer composite comprises reactive type flame retardant (flame-retardant group becomes part of the polymer chain structure after polymerization or crosslinking), additive type flame retardant (additive simply dispersed in the polymer matrix), or both types. For instance, the elastic polymer composite may comprise a flame retardant chemical group that is bonded to polysiloxane, which is elastic.

In certain embodiments, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material.

In some embodiments, the high-elasticity polymer further comprises from 0.01% to 95% by weight of an inorganic filler dispersed therein. The inorganic filler may be selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof. The transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof.

The inorganic filler may be selected from an inorganic solid electrolyte material in a fine powder form having a particle size from 2 nm to 30 μm. Preferably, the elastic layer further comprises from 1% to 90% by weight of particles of an inorganic solid electrolyte material dispersed therein wherein the particles have a particle size preferably from 10 nm to 30 μm, more preferably from 50 nm to 1 μm.

The inorganic solid electrolyte material may be selected from an oxide type, sulfide type, hydride type, halide type, borate type, phosphate type, lithium phosphorus oxynitride (LiPON), Garnet-type, lithium superionic conductor (LISICON), sodium superionic conductor (NASICON), or a combination thereof.

In the lithium secondary battery, the working electrolyte is selected from an organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, hybrid or composite electrolyte, or a combination thereof.

A high-elasticity polymer refers to a polymer, typically a lightly cross-linked polymer, which exhibits an elastic deformation that is at least 5% (preferably at least 10%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%. The elasticity of the elastic polymer alone (without any additive dispersed therein) can be as high as 1,000%. However, the elasticity can be significantly reduced if a certain amount of inorganic filler is added into the polymer. Depending upon the type and proportion of the solid electrolyte particles incorporated, the reversible elastic deformation is typically reduced to the range of 5%-500%, more typically 5%-300%.

The high-elasticity polymer may comprise an elastomer that forms a mixture, a copolymer, a semi-interpenetrating network, or a simultaneous interpenetrating network with the high-elasticity polymer, wherein the elastomer is selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polysiloxane, polyurethane, urethane-urea copolymer, urethane-acrylic copolymer, a copolymer thereof, a sulfonated version thereof, or a combination thereof.

The high-elasticity polymer may further comprise from 0.1% to 50% by weight of a lithium ion-conducting additive, which is different from the inorganic solid electrolyte particles.

In certain embodiments, the anode contains a current collector without a lithium metal or any other anode active material, such as graphite or Si particles, when the battery cell is manufactured. Such a battery cell having an initially lithium metal-free anode is commonly referred to as an "anode-less" lithium battery. The lithium ions that are required for shuttling back and forth between the anode and the cathode are initially stored in the cathode active materials (e.g., Li in $LiMn_2O_4$ and $LiMPO_4$, where M=Ni, Co, F, Mn, etc.). During the first battery charge procedure, lithium ions ($Li^+$) come out of the cathode active material, move through the electrolyte and then through the presently disclosed elastic and flame retardant composite separator and get deposited on a surface of the anode current collector. As this charging procedure continues, more lithium ions get deposited onto the current collector surface, eventually forming a lithium metal film or coating. The high-elasticity nature of the disclosed separator may be squeezed when the lithium film increases in thickness.

During the subsequent discharge, this lithium film or coating layer decreases in thickness due to dissolution of lithium into the electrolyte to become lithium ions, possibly creating a gap between the current collector and the protective layer if the separator layer were not elastic. Such a gap would make the re-deposition of lithium ions back to the anode impossible during a subsequent recharge procedure. We have observed that the elastic composite separator is capable of expanding or shrinking congruently or conformably with the anode layer. This capability helps to maintain a good contact between the current collector (or the lithium film itself) and the protective layer, enabling the re-deposition of lithium ions without interruption.

In certain embodiments, the high-elasticity polymer further contains a reinforcement material dispersed therein wherein the reinforcement material is selected from a polymer fiber, a glass fiber, a ceramic fiber or nano-flake (e.g. nano clay flakes), or a combination thereof. The reinforcement material preferably has a thickness or diameter less than 100 nm.

The elastic polymer protective layer may further comprise a lithium salt (as a lithium ion-conducting additive) dispersed in the polymer wherein the lithium salt may be preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate(LiBOB), lithium oxalyldifluoroborate ($LiBF_2C_2O_4$), lithium nitrate ($LiNO_3$), Li-fluoroethyl-phosphate ($LiPF_3(CF_2CF_3)_3$), lithium bisperfluoro-ethysulfonylimide (LiBETI), lithium bis(fluorosulphonyl)imide, an ionic liquid-based lithium salt, or a combination thereof.

The elastic polymer protective layer preferably has a lithium ion conductivity no less than $10^{-5}$ S/cm, more preferably no less than $10^{-4}$ S/cm, and most preferably no less than $10^{-3}$ S/cm. Some of the selected polymers exhibit a lithium-ion conductivity greater than $10^{-2}$ S/cm.

In some embodiments, the high-elasticity polymer further comprises a lithium ion-conducting additive dispersed in a high-elasticity polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$, $1\le y\le4$.

In some embodiments, the high-elasticity polymer forms a mixture, blend, semi-IPN, or simultaneous interpenetrating network (SIPN) with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The cathode active material may be selected from an inorganic material, an organic material, a polymeric material, or a combination thereof. The inorganic material may be selected from sulfur, selenium, a metal oxide, metal phosphate, metal silicide, metal selenide (e.g. lithium polyselides for use in a Li—Se cell), metal sulfide (e.g. lithium polysulfide for use in a Li—S cell), or a combination thereof. Preferably, these cathode active materials contain lithium in their structures; otherwise the cathode should contain a lithium source.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The cathode active material layer may contain a metal oxide containing vanadium oxide selected from the group consisting of $Li_xVO_2$, $Li_xV_2O_5$, $Li_xV_3O_8$, $Li_xV_3O_7$, $Li_xV_4O_9$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound borate compound $LiMBO_3$, or a combination thereof, wherein M is a transition metal or a mixture of multiple transition metals.

The cathode active material may preferably comprise lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{a-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

The cathode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a high-elasticity polymer layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

In certain embodiments, the elastic polymer protective layer has two primary surfaces with a first primary surface facing the anode side and a second primary surface opposing or opposite to the first primary surface (facing the cathode side) and wherein the flame-retardant and/or optional solid electrolyte powder has a first concentration at the first surface and a second concentration at the second surface and the first concentration is greater than the second concentration. In other words, there are more flame retardant and/or inorganic particles at anode side of the elastic composite separator layer than the opposite side intended to be facing the cathode. There is a concentration gradient across the thickness of the elastic composite separator layer. The high concentration of the flame retardant and/or inorganic solid electrolyte particles on the anode side (preferably >30% by weight and more preferably >60% by weight) can help stop the penetration of any lithium dendrite, if formed, and help to form a stable artificial solid-electrolyte interphase (SEI). The high concentration of a flame retardant facing the anode side also acts to suppress any internal thermal run-away or fire. Thus, in some embodiments, the elastic composite separator has a gradient concentration of the flame retardant and/or the inorganic solid electrolyte particles across the thickness of the separator.

The present disclosure also provides a process for manufacturing the elastic polymer protective layer, the process comprising (A) dispersing an optional flame retardant additive and/or optional particles of the inorganic solid electrolyte particles in a liquid reactive mass of a precursor to a high-elasticity polymer (a reactive polymer and a crosslinking agent, or a mixture of a monomer/oligomer, an optional catalyst/initiator, and a crosslinking agent) to form a reactive suspension/slurry wherein the monomer, oligomer or reactive polymer is derived from a phosphazene compound; (B) dispensing and depositing a layer of the liquid reactive mass or suspension/slurry onto a solid substrate surface; and (C) polymerizing and/or curing (crosslinking) the reactive mass to form a layer of high-elasticity polymer. The high-elasticity polymer comprises at least a crosslinked polymer network of chains derived from at least one phosphazene compound.

The solid substrate may be an anode current collector, an anode active material layer, a cathode active material layer, or a solid separator (e.g., a solid ceramic separator). In other words, this elastic polymer protective layer can be directly deposited onto a layer of anode active material, an anode current collector, a layer of cathode active material, or a solid separator. This is achievable because curing of the presently disclosed high-elasticity polymer does not require a high temperature; curing temperature typically being lower than 300° C., more typically lower than 200° C. or even lower than 100° C. This is in stark contrast to the typically 900-1,200° C. required of sintering an inorganic solid electrolyte to form a ceramic separator. In addition, the presently disclosed elastic polymer protective layer is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation (e.g. electron beam or gamma radiation) to polymerize and/or croslink the reactive mass to form a continuous layer or roll of elastic polymer; and (iii) collecting the elastic polymer on a winding roller. This process is conducted in a reel-to-reel manner.

The process may further comprise unwinding the elastic polymer roll or layer from the winding roller and cutting/trimming the roll (or part of the roll) of elastic polymer into one or multiple pieces of elastic polymer protective layers.

The process may further comprise combining an anode, the elastic polymer protective layer, an optional separator, a working electrolyte, and a cathode electrode to form a lithium battery.

The disclosure also provides an elastic and flame retardant composite layer, wherein the elastic and flame retardant composite comprises a high-elasticity polymer and from 0.1% to 70% by weight of a flame retardant additive dispersed in, dissolved in, or chemically bonded to the high-elasticity polymer, wherein said elastic composite separator has a thickness from 50 nm to 200 µm and a lithium ion conductivity from $10^{-8}$ S/cm to $5\times10^{-2}$ S/cm at room temperature and said high elasticity polymer has a fully recoverable tensile strain from 5% to 1,000% when measured without any additive dispersed therein and wherein the high-elasticity polymer comprises at least a crosslinked polymer network of chains derived from at least one phosphazene compound.

Preferably, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material.

Such an elastic, ion-conducting, and flame-retardant composite may be used as a separator, an anode protection layer, or both for a lithium secondary battery.

Preferably, the high-elasticity polymer composite has a lithium ion conductivity from $1 \times 10^{-5}$ S/cm to $5 \times 10^{-2}$ S/cm. In some embodiments, the high-elasticity polymer composite has a recoverable tensile strain from 10% to 300% (more preferably >30%, and further more preferably >50%).

In certain embodiments, some additive, such as particles of a solid inorganic electrolyte, an elastomer (or its precursor), an ion-conductive polymer, a lithium-ion conducting material, a reinforcement material (e.g. high-strength, non-conducting fibers), or a combination thereof may be added into the reactive mass.

The lithium ion-conducting material is dispersed in the high-elasticity polymer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the lithium ion-conducting material dispersed in the reactive mass is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroethyl-phosphate ($LiPF_3(CF_2CF_3)_3$), lithium bisperfluoroethylsulfonylimide (LiBETI), lithium bis(fluorosulfonyl) imide, an ionic liquid-based lithium salt, or a combination thereof.

If desired, the resulting elastic polymer protective layer may be soaked in or impregnated with an organic or ionic liquid electrolyte.

DETAILED DESCRIPTION

Figure 1:
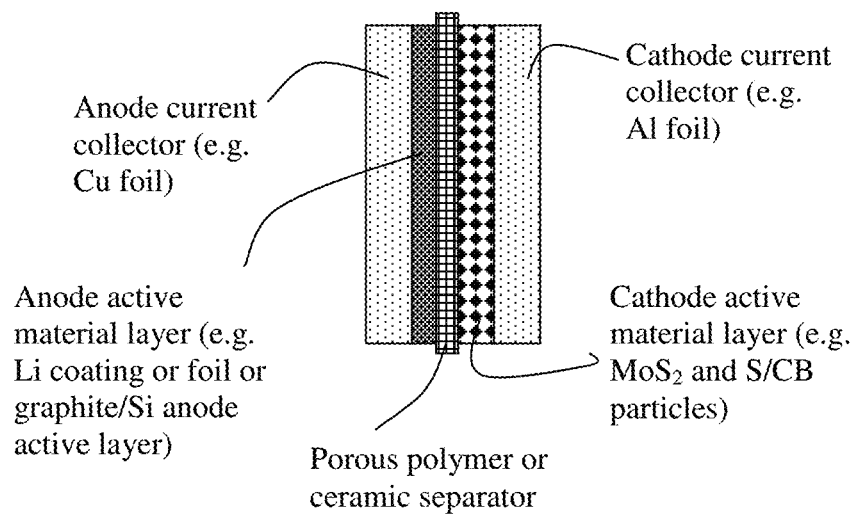
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This disclosure is related to a lithium secondary battery, wherein the working electrolyte is preferably based on an organic electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte.

The present disclosure provides a lithium secondary battery comprising a cathode, an anode, and an elastic polymer protective layer disposed between the cathode and the anode, and a working electrolyte through which lithium ions are transported between the anode and the cathode during a battery charge or discharge, wherein the elastic polymer protective layer comprises a high-elasticity polymer having a thickness from 2 nm to 200 μm (preferably 5-100 nm if used as an anode-protecting layer; or preferably from 1 to 20 μm if used as a separator), a lithium ion conductivity from $10^{-8}$ S/cm to $5 \times 10^{-2}$ S/cm at room temperature, and a fully recoverable tensile elastic strain from 5% to 1,000% (preferably greater than 10% and further preferably from 30% to 300%) when measured without any additive dispersed therein. The high-elasticity polymer comprises at least a crosslinked polymer network of chains derived from at least one phosphazene compound. The high-elasticity polymer may preferably comprise a cross-linked network of polymer chains crosslinked by a curing/crosslinking agent to a degree of crosslinking that imparts an elastic tensile strain preferably from 5% to 500%.

Polyphosphazenes, also commonly referred to as poly (organo)phosphazenes, are a family of inorganic molecular hybrid polymers based on a phosphorus-nitrogen backbone substituted with organic side groups which show very differing properties due to the vast array of organic substituents possible. The method of synthesizing polyphosphazenes depends on the desired type of polyphosphazene. The most widely used method for linear polymers is based on a two-step process. In the first step, hexachlorocyclotriphosphazene, $(NPCl_2)_3$ (Chemical formula 1) is heated in a sealed system at 250° C. to convert it to a long chain linear polymer, $[NPCl_2]n$ (or Chemical formula 2), having typically 15,000 or more repeating units. This reaction is illustrated in the following Reaction 1:

(Reaction 1)

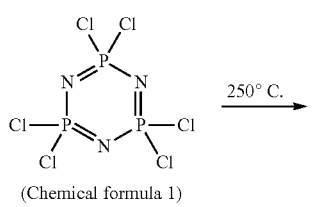

(Chemical formula 1)

-continued

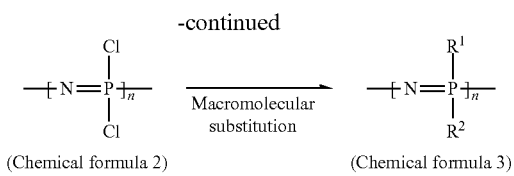

(Chemical formula 2)    (Chemical formula 3)

In the second step the chlorine atoms linked to phosphorus in the polymer are replaced by organic groups through reactions with $R^1$ or $R^2$ to form Chemical formula 3, where $R^1$ and $R^2$ may be independently selected from alkoxides, aryloxides, amines, or organometallic reagents, etc. Many different reagents can be used in this macromolecular substitution reaction and, hence, a large number of different polymers can be produced. All these polymers are herein referred to as a polyphosphazene. Some examples of the macromolecular substitution, for illustration purposes, are shown below (Reactions 2a, 2b, and 2c):

(Reactions 2a, 2b, and 2c)

a)

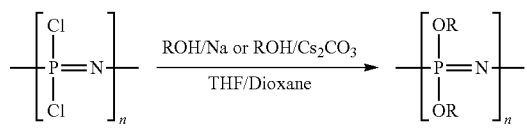

b)

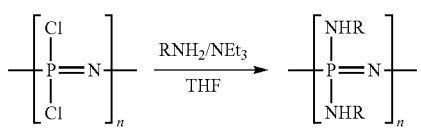

c)

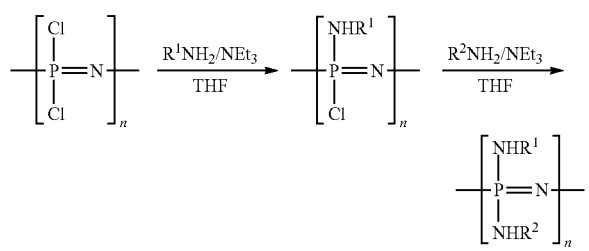

Polyphosphazene polymers include a wide range of hybrid inorganic-organic polymers with a number of different skeletal architectures that has the backbone P—N—P—N—P—N—. In nearly all of these materials two organic side groups are attached to each phosphorus center. Additional examples of phosphazene polymers include the following:
  (a) Linear polymers have the formula $(N=PR^1R^2)_n$, where $R^1$ and $R^2$ are organic;
  (b) Cyclolinear and cyclomatrix polymers in which small phosphazene rings are connected together by organic chain units.
  (c) Block copolymer, star, dendritic, or comb-type structures.
A large number of different polyphosphazenes are known, with different side groups (R) and different molecular architectures.

For discussion purposes, polyphosphazenes may be conveniently divided into two major classes-those in which the side groups are attached to phosphorus via oxygen (P—OR) or nitrogen (P—NR$_2$) linkages and those in which the substituents are attached directly to phosphorus through phosphorus-carbon bonds, i.e., the poly(alkyl phosphazenes and poly(aryl phosphazenes). The present disclosure provides both types of polyphosphazenes as an ingredient in the quasi-solid or solid electrolytes.

It is also possible to achieve controlled polymerization of [NPCl$_2$]n via a living cationic polymerization of trichlorophosphoranimine (Cl$_3$PNSiMe$_3$). This can be carried out in solution at room temperature via reaction of Cl$_3$PNSiMe$_3$ with two equivalents of PCl$_5$ giving a cationic species [Cl$_3$PNPCl$_3$]$^+$ with PCl$_6^-$ as the counterion (Reaction 3a). This species can initiate the polymerization upon addition of further equivalents of Cl$_3$PNSiMe$_3$ leading to polymer chains with a "living" cationic end group. One equivalent of ClSiMe$_3$ is formed as a side product with every monomer molecule added to the polymer, making this polymerization a rare example of a polycondensation reaction which occurs via a chain growth mechanism (compared to most polycondensation reactions having a step-growth mechanism). The living chain growth mechanism, with one cationic initiator per propagating chain, allows not only control of molecular weight via the feed monomer to initiator ratio, but also leads to poly(dichloro) phosphazenes with a narrow index of polydispersity. Reaction times may vary depending on the desired polymer chain length, the monomer concentration and the nature of the counter ion, but Cl$_3$PNSiMe$_3$ is observed to be consumed completely relatively quickly within a few hours in dichloromethane.

The living cationic polymerization requires large amounts of the monomer Cl$_3$PNSiMe$_3$ of high purity, usually prepared via reaction of PCl$_3$ with LiN(SiMe$_3$)$_2$ to form Cl$_2$PN(SiMe$_3$)$_2$, followed by oxidation with the chlorinating agent SO$_2$Cl$_2$ to give Cl$_3$PNSiMe$_3$. To incorporate polyphosphazene into a battery cell, we have invented a method to produce [NPCl$_2$]$_n$ directly via in situ preparation and polymerization of Cl$_3$PNSiMe$_3$. This route could facilitate upscaling and the industrial preparation of polyphosphazene in a battery, as it avoids the vacuum distillation of the monomer.

When PCl$_5$ is used to form the cationic initiator for the living polymerization of Cl$_3$PNSiMe$_3$ (Reaction 3a), some bidirectional growth can be observed due to the ability of the cationic propagating site to migrate. Furthermore, both end groups are identical after macro-substitution of the chlorine atoms, thus limiting the options in terms of the preparation of polymers with higher architectures. However, monodirectional growth can be achieved via the use of R$_3$PNSiMe$_3$ type moieties (Reaction 3b). Reaction of such phosphoranimines with two equivalents of PCl$_5$ gives a cationic species capable of initiating the polymerization of Cl$_3$PNSiMe$_3$ via an identical mechanism. The R groups, typically phenyl groups, effectively block one end of the initiating species, forcing the polymerization to proceed in only one direction and more importantly resulting in polymers with defined chain ends.

(Reactions 3a, 3b, and 3c)

a)

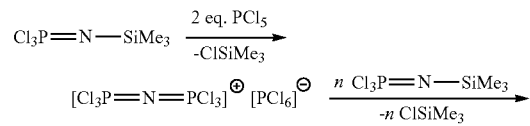

-continued

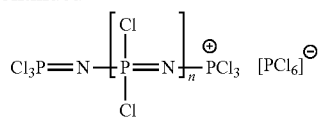

b)

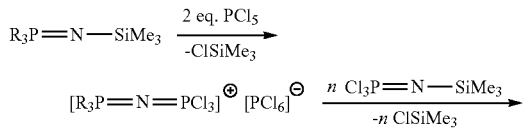

c)

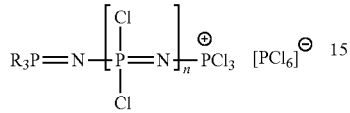

It is also possible to directly synthesize poly(organo)phosphazenes, without going through the [NPCl₂]ₙ precursor route. For instance, one can conduct the anionic polymerization of N-silylphosphoranimines with fluoride ion initiators in the presence of N-methylimidazole (Reaction 4):

(Reactions 4)

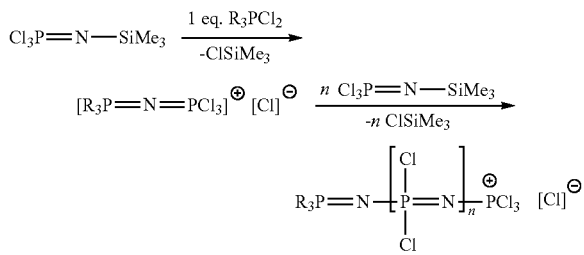

This polymerization has living character and enables the preparation of polymers with an index of polydispersity between 1.3 and 2.3 at 125° C. The polymerization of similar N-silylphosphoranimines can be initiated by H₂O with a catalytic amount of N-methylimidazole with good living polymerization kinetics, enabling robust preparation of poly(bistrifluoroethoxy phosphazene). The same method can be followed to prepare poly(organo)phosphazenes with excellent control of molecular weight and polydispersity from a wider range of monomers.

Poly(alkyl/aryl)phosphazenes, [NPR₂]n, whereby the organic substituent is directly attached via a P—C bond, can also be prepared via direct polymerization routes. Initially developed by thermal (100-180° C.) condensation of (CF₃CH₂O)R₂PQNSiMe₃ type monomers, this can be used for cationic initiators and with monomers of the type BrR₂PQNSiMe₃. The polymerization of halo(alkyl/aryl) phosphoranimines (XR₂PNSiMe₃, X=Br or Cl) initiated by organic phosphites ((MeO)₃P can be an effective route to poly(alkyl/aryl)phosphazenes at ambient temperature (Reaction 5).

(Reaction 5)

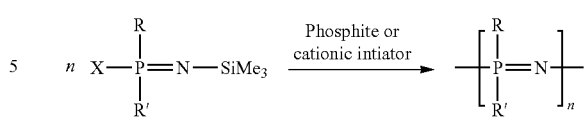

Additionally, such phosphoranimines can be combined with the cationic polymerization of [NPCl₂]n (Reaction 6), thus allowing the preparation of block copolymers:

(Reaction 6)

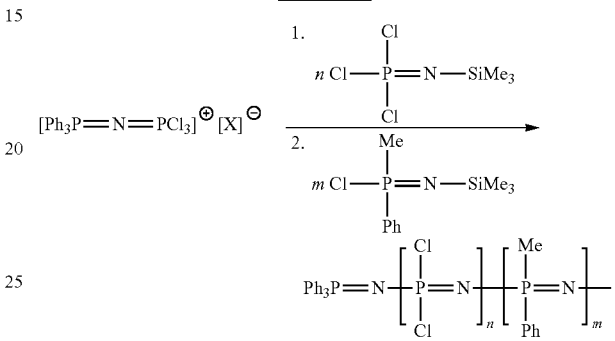

Preparation of block copolymers, graft polymers with organic side-chains, and other advanced architectures, such as polyphosphazenes with a branched polyphosphazene backbone, supramolecular structures from polyphosphazenes, helical structures with polyphosphazenes, cyclomatrix polyphosphazenes, and dendrimers from hexachlorocyclotriphosphazene, can also be achieved.

The polyphosphazene polymer is typically synthesized from a reactive precursor monomer, oligomer, or polymer selected from Chemical formula 1, Chemical formula 2, Chemical formula 3, Chemical formula 4, or a combination thereof:

(Chemical formula 1)

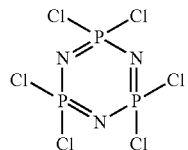

(Chemical formula 2)

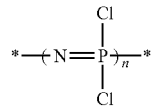

(Chemical formula 3)

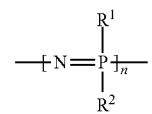

(Chemical formula 4)

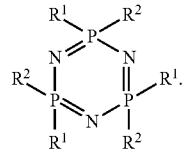

In these formulae, R, $R^1$, and $R^2$ may be independently selected from organic groups (e.g. alkoxides, aryloxides, and amine groups) and organometallic groups, etc.

A desirable group of polymerizable phosphazene derivative or compound is of the general formula: $[-NP(A)a(B)b-]_x$ (Chemical formula 5), wherein the groups A and B are bonded to phosphorous atoms through —O—, —S—, —NH—, or —NR—, wherein R is a $C_1$-$C_6$ alkyl group; A contains at least one of a vinyl ether group of the general formula Q—O—CR′=CHR″ and a styrene ether group of the general formula:

wherein at least one of R′ and R″ are hydrogen or a $C_1$-$C_{10}$ alkyl group; B is a reactive or nonreactive hydrocarbon group optionally containing at least one of O, S, and N, and optionally containing at least one reactive group; Q is one of an aliphatic, cycloaliphatic, aromatic, and heterocyclic hydrocarbon group optionally containing at least one of O, S, and N; a is a number greater than 0; b is 0 or a number greater than 0; a+b=2, x stands for a whole number that is at least 2; and z stands for 0 or 1.

Further desirably, A is of the general formula:

and B=Z′-YH, so that the phosphazene derivative is of the general formula:

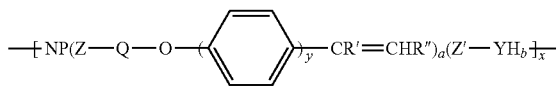

wherein Z and Z′ are the same or different and each e stands for —O—, —S—, —NH—, or —NR— wherein R is a $C_1$-$C_6$ alkyl; Q is at least one of an aliphatic, cycloaliphatic, aromatic, and heterocyclic hydrocarbon group optionally containing at least one of O, S, and N; YH stands for at last one of an aliphatic, cycloaliphatic, aromatic, and heterocyclic hydrocarbon group optionally containing at least one of O, S, and N and optionally containing a reactive group different from a vinyl ether group or a styrene ether group; y is 0 or 1; x is a whole number from 2 to 20; and a, b, R′ and R″ are defined as above.

The presently disclosed phosphazenes (also commonly referred to as phosphazene derivatives or phosphazene compounds) can be cured by a process that is initiated cationically, which bears many advantages. The phosphazene derivatives of the disclosure can contain two or more different vinyl ether groups and/or both vinyl ether groups and styrene ether groups in one molecule. These phosphazene derivatives, which can be polymerized cationically at least when substituted by vinyl ether groups, and polymerization of these phosphazenes can be initiated by acids. Phosphite or other cationic initiators may be used. They have one or more of the following advantages: complete substitution of the phosphazene and thus absence of chlorine can be achieved in high yields; oxygen does not inhibit the curing of the presently disclosed phosphazene derivatives; they are normally less viscous and therefore more suitable for injection into dry battery cells.

In some preferred embodiments, in the polymerizable phosphazene derivatives designated as $[-NP(A)a(B)b-]_x$ (Chemical formula 5), A and B are identical to or different from each other and independently represent a polymerization curable group containing an acryl group, a methacryl group, a vinyl group or an allyl group or a non-polymerization curable group, including a hydrogen atom, a halogen atom, a phenoxy group, a halogenated phenoxy group, an alkoxy group, a halogenated alkoxy group, an amino group, an alkylamino group, a halogenated alkylamino group or a mercapto group, provided however that at least one of A and B is a polymerization curable group; a and b are independently each 0 or an integer larger than 0, provided however that the sum of a and b is 2; and n is an integer of 3 or larger.

In this general formula $[-NP(A)a(B)b-]_x$, the polymerization curable group referred to by the reference symbol A and B is not restricted to any particular group as long as the group is provided with an unsaturated linkage polymerizable with heating or upon exposure to ultraviolet light, electron beam, or other forms of high-energy radiation and includes a group containing an acryl group, a methacryl group, a vinyl group or an allyl group. Preferred are an acryloyloxy group and a methacryloyloxy group from the viewpoint of the curing rate.

In this general formula, the non-polymerization curable group referred to by the reference symbol A and B can include a hydrogen atom, a halogen atom, a phenoxy group, a halogenated phenoxy group, an alkoxy group, a halogenated alkoxy group, an amino group, an alkylamino group, a halogenated alkylamino group or a mercapto group.

In order to improve the flame retardance, there may be introduced, as a non-polymerization group, a fluorine-containing group as represented by the following general formula: $-OCH_2(CF_2)_mZ^1$, wherein m is an integer from 1 to 4; and $Z^1$ is a hydrogen atom or a fluorine atom, or as represented by the following general formula: $-OCH(CF_3)_2$.

A fluoride capable of introducing the fluorine-containing group may include, for example, 2,2,2-trifluoroethanol, 2,2,3,3,3-pentafluoro-1-propanol, 2,2,3,3,4,4,4-heptafluoro-1-butanol, 2,2,3,3-tetrafluoro-1-propanol, 2,2,3,3,4,4,5,5-octafluoro-1-pentanol, and 1,1,1,3,3,3-hexafluoro-2-propanol.

In accordance with certain embodiments of the present disclosure, the group represented. by the reference symbols A and/or B in the general formula above is preferably a group as represented by the following Chemical formula 6:

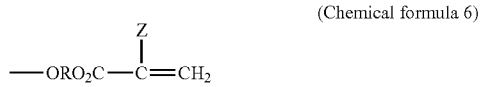

(Chemical formula 6)

wherein R is an alkylene group having from 1 to 12 carbon atoms; and Z is a hydrogen atom or a methyl group. In the general formula, the alkylene group referred to by the reference symbol R may include a linear or branched alkylene group, and an ethylene group is a preferred alkylene group.

Representative examples of the groups represented by the Chemical formula (6) above may include, for example, a residue (hereinafter referred to sometimes as a methacrylate residue) obtainable by removing a hydrogen atom from the hydroxy group of a methacrylate, such as 2-hydroxyethyl methacrylate, 2-hydroxypropyl methacrylate, 2-hydroxybutyl methacrylate, 3-hydroxybutyl methacrylate, 4-hydroxybutyl methacrylate, 5-hydroxypentyl methacrylate, 6-hydroxy-3-methylhexyl methacrylate, 5-hydroxyhexyl methacrylate, 3-hydroxy-2-t-butylpropyl methacrylate, 3-hydroxy-2,2-dimethylhexyl methacrylate, 3-hydroxy-2-methylethylpropyl methacrylate and 12-hydroxydodecyl methacrylate; and a residue (hereinafter referred to sometimes as an acrylate residue) obtainable by removing a hydrogen atom from the hydroxy group of an acrylate, such as 2-hydroxylethyl acrylate, 2-hydroxypropyl acrylate, 2-hydroxybutyl acrylate, 3-hydroxybutyl acrylate, 4-hydroxybutyl acrylate, 5-hydroxypentyl acrylate, 6-hydroxy-3-methylhexyl acrylate, 5-hydroxyhexyl acrylate, 3-hydroxy-2-t-butylpropyl acrylate, 3-hydroxy-2,2-dimethylhexyl acrylate, 3-hydroxy-2-methylethylpropyl acrylate and 12-hydroxydodecyl acrylate. Preferred are the 2-hydroxylethyl methacrylate residue and 2-hydroxylethyl acrylate residue.

As a result of comparison of a hydroxylalkyl methacrylate residue with a hydroxylalkyl acrylate residue, the hydroxylalkyl acrylate residue is more preferred in terms of the curing rate. The curable phosphazene compounds as represented by the Chemical formula (5) above may be one in which the reference symbol n is an integer of 3 or greater, preferably from 3 to 18, and, more preferably, a cyclic compound in which n is 3 or 4 or a mixture thereof.

The curable phosphazene compounds may be prepared by known processes. For instance, a reaction of hexachlorocyclotriphosphazene with 2-hydroxylethyl methacrylate yields a phosphazene compound in which a portion or all of the chlorine atoms of the hexachlorocyclotriphosphazene is substituted by the 2-hydroxylethyl methacrylate residue. In this case, it is preferred that all the chlorine atoms are substituted although it is possible that a portion of the chlorine atoms is left unsubstituted. In this reaction, it is advantageous to use a tertiary amine because it can facilitate the reaction of removing hydrogen chloride. Such a tertiary amine may include, for example, trimethyl amine, triethyl amine, triisopropyl amine, tri-n-propyl amine, tri-n-butyl amine and pyridine. Most preferred is pyridine.

The reaction may be carried out usually in an organic solvent which may include, for example, benzene, toluene, xylene, chloroform, cyclohexane, methylene chloride or tetrahydrofuran or a mixture thereof.

The chlorophosphazene compound to be used as a starting material for the preparation of the phosphazene compound may preferably include a trimer of dichlorophosphazene, i.e., hexachlorocyclotriphosphazene, teromer thereof, i.e., octachlorocyclotetraphosphazene, or an oligomer thereof, because the phosphazene compound obtained by using the trimer, teromer or oligomer thereof can readily control the cross-linkage density in the final electrolyte product (obtainable by curing the phosphazene compound).

The in situ curable resin composition according to some embodiments of the present disclosure contains the pentaerythritol acrylate compound and/or the bis(4-acryloxydialkoxyphenyl)alkane compound, on top of the curable phosphazene compound as have been described hereinabove. Examples of the pentaerythritol acrylate compounds include pentaerythritol triacrylate, dipentaerythritol hexaacrylate or dipentaerythritol monohydroxypentaacrylate. Among these compounds, pentaerythritol triacrylate, dipentaerythritol hexaacrylate, and dipentaerythritol monohydroxypentaacrylate are preferred. The pentaerythritol acrylate compound may be used singly or in combination thereof. Preferably, the pentaerythritol acrylate compound is a mixture of dipentaerythritol hexaacrylate with dipentaerythritol monohydroxypentaacrylate.

The pentaerythritol acrylate compound may be obtained, for example, by reacting pentaerithritol with acrylic acid. Furthermore, among these pentaerythritol acrylate compounds, it is preferred to use a mixture of the dipentaerythritol hexaacrylate containing 0.3 to 0.5 in mole of dipentaerythritol monohydroxypentaacrylate that is readily available, in terms of curability.

The curing agent may be preferably from, for example, a photopolymerization initiator such as 1-hydroxycyclohexylphenyl ketone, dibenzoyl, benzoyl methyl ether, benzoyl ethyl ether, p-chlorobenzophenone, p-niethoxybenzophenone, benzoyl peroxide, di-tert.-butyl peroxide and camphaquinone. These curing agents may be used singly or in combination thereof. They may be used in an amount ranging usually from 0.05 parts to 10.0 parts by weight with respect to 100 parts by weight of the curable resin composition.

When the curable resin composition is cured by heating at elevated temperatures or cured at ambient temperatures, it is preferred to use a peroxide compound, an amine compound or a mixture thereof as a polymerization initiator. Representative examples of the peroxide compounds include benzoyl peroxide, P-chlorobenzoyl peroxide, 2,4-dichlorobenzoyl peroxide, t-butyl hydroperoxide, di-t-butyl peroxide, dicumyl peroxide, t-butyl peroxyacetate, diacetate or t-butyl peroxybenzoate. As representative examples of the amine compounds may be enumerated, for example, N,N-diethanol-p-toluidine, dimethyl-p-toluidine, p-toluidine, methyl amine, t-butyl amine, methylethyl amine, diphenyl amine, 4,4'-dinitrodiphenyl amine, o-nitroaniline, p-bromoaniline or 2,4,6-tribromoaniline. They may be used singly or in combination thereof and in an amount ranging usually from 0.05 parts to 10.0 parts by weight, preferably from 0.1 to 6.0 parts by weight, with respect to 100 parts by weight of the curable resin composition.

A high-elasticity polymer may comprise an electrolyte solvent (e.g., an organic solvent or ionic liquid), a lithium salt, or both that are dispersed in the polymer chain network (impregnated into or trapped in the polymer chain network). The liquid electrolyte (lithium salt dissolved in a non-aqueous solvent) is preferably from 1% to 95% by weight, preferably from 5% to 50%, based on the total weight of polymer, liquid solvent, and lithium salt combined. The liquid content is further preferably less than 20% and most preferably less than 5%.

Examples of the ionizable lithium salt in the composition for an electrolyte according to one embodiment of the present disclosure may include, but are not limited to, any one selected from the group consisting of from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroethyl-phosphate ($LiPF_3(CF_2CF_3)_3$), lithium bisperfluoroethysulfonylimide (LiBETI), lithium bis(fluorosulphonyl) imide, an ionic liquid lithium salt, or a combination thereof.

The liquid electrolyte may comprise a liquid solvent selected from those commonly used in liquid electrolytes for a lithium secondary battery. These include, for example, ether, ester, amide, linear carbonate, cyclic carbonate and the like. They may be used either alone or as a mixture of two or more thereof. Among these, carbonate compounds such as cyclic carbonate, linear carbonate or a mixture thereof may be typically used. Specific examples of the cyclic carbonate compound may comprise any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more types thereof. In addition, specific examples of the linear carbonate compound may comprise, but are not limited to, any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more thereof.

The liquid solvent may be selected from a fluorinated carbonate, hydrofluoroether, fluorinated vinyl carbonate, fluorinated ester, fluorinated vinyl ester, fluorinated vinyl ether, sulfone, sulfide, nitrile, phosphate, phosphite, phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof. Ionic liquids or organic liquids that are intrinsically flame-retardants are preferred.

For instance, the liquid solvent may be selected from fluorinated solvents, such as fluorinated vinyl carbonates, fluorinated esters, fluorinated vinyl esters, and fluorinated vinyl ethers. Fluorinated vinyl esters include $R_fCO_2CH=CH_2$ and Propenyl Ketones, $R_fCOCH=CHCH_3$, where $R_f$ is F or any F-containing functional group (e.g., $CF_2$— and $CF_2CF_3$—).

Two examples of fluorinated vinyl carbonates are given below:

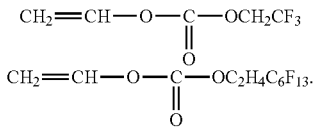

In some embodiments, the fluorinated carbonate is selected from fluoroethylene carbonate (FEC), DFDMEC, FNPEC, hydrofluoro ether (HFE), trifluoro propylene carbonate (FPC), methyl nonafluorobutyl ether (MFE), a combination thereof, wherein the chemical formulae for FEC, DFDMEC, and FNPEC, respectively are shown below:

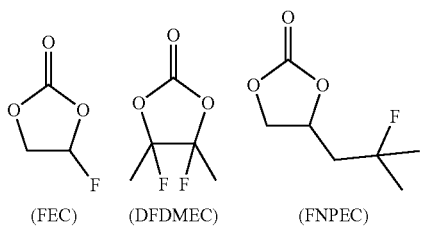

Sulfone-based liquid solvents include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

In certain embodiments, the sulfone-based liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

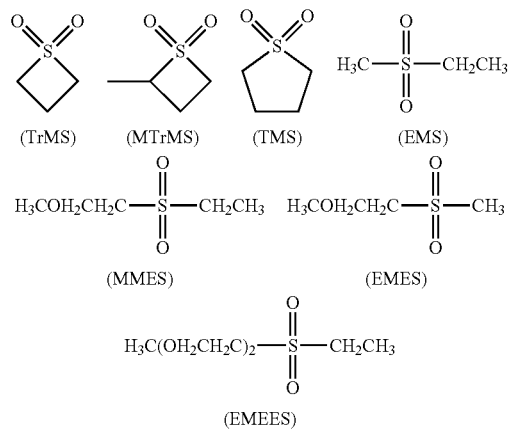

The nitrile may be selected from dinitriles, such as AND, GLN, and SEN, which have the following chemical formulae:

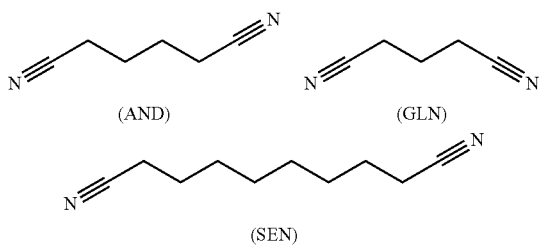

In a typical configuration, the elastic polymer protective layer is in ionic contact with both the anode and the cathode and typically in physical contact with an anode active material layer (or an anode current collector) and with a cathode active material layer.

In certain embodiments, the anode in the lithium secondary battery has an amount of lithium or lithium alloy as an anode active material supported by an anode current collector. In certain other embodiments, initially the anode has no lithium or lithium alloy as an anode active material supported by an anode current collector when the battery is made and prior to a charge or discharge operation of the battery. This latter configuration is referred to as an anode-less lithium battery.

In certain embodiments, the battery is a lithium-ion battery and the anode has an anode current collector and a layer of an anode active material supported by the anode current collector, which is in physical contact with the elastic flame-retardant composite separator. The anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobium oxide, lithium-containing titanium oxide, lithium transition metal oxide, $ZnCo_2O_4$; (f) carbon or graphite particles (g) prelithiated versions thereof; and (h) combinations thereof.

The current collector may be a Cu foil, a layer of Ni foam, a porous layer of nano-filaments, such as graphene sheets, carbon nanofibers, carbon nano-tubes, etc. forming a 3D interconnected network of electron-conducting pathways.

Preferably and most typically, this elastic polymer protective layer is different in composition than the working electrolyte used in the lithium battery and the elastic composite layer maintains as a discrete layer (not to be dissolved in the electrolyte).

We have discovered that this elastic polymer protective layer provides several unexpected benefits: (a) the formation and penetration of dendrite can be essentially eliminated; (b) uniform deposition of lithium back to the anode side is readily achieved during battery charging; (c) the layer ensures smooth and uninterrupted transport of lithium ions from/to the anode current collector surface (or the lithium film deposited thereon during the battery operations) and through the interface between the current collector (or the lithium film deposited thereon) and the elastic polymer protective layer with minimal interfacial resistance; (d) flame and fire-fighting capability is intrinsically built into the battery; (e) reduced/eliminated electrolyte/lithium metal reactions; (e) reduced interfacial resistance at both the anode side and the cathode side; and (f) cycle stability can be significantly improved and cycle life increased. No additional protective layer for the lithium metal anode is required. The separator itself also plays the role as an anode protective layer.

In a conventional lithium metal cell, as illustrated in FIG. 1, the anode active material (lithium) is deposited in a thin film form or a thin foil form directly onto an anode current collector (e.g., a Cu foil) before this anode and a cathode are combined to form a cell. The battery is a lithium metal battery, lithium sulfur battery, lithium-selenium battery, etc. As previously discussed in the Background section, these lithium secondary batteries have the dendrite-induced internal shorting and "dead lithium" issues at the anode.

We have solved these challenging issues that have troubled battery designers and electrochemists alike for more than 30 years by developing and implementing a new elastic polymer protective layer disposed between the anode (an anode current collector or an anode active material layer) and a cathode active material layer. This elastic polymer protective layer comprises a high-elasticity polymer having a recoverable (elastic) tensile strain no less than 5% (preferably no less than 10%, and further preferably from 30% to 500%) under uniaxial tension and a lithium ion conductivity no less than $10^{-8}$ S/cm at room temperature (preferably and more typically from $1\times10^{-5}$ S/cm to $5\times10^{-2}$ S/cm).

Figure 2:
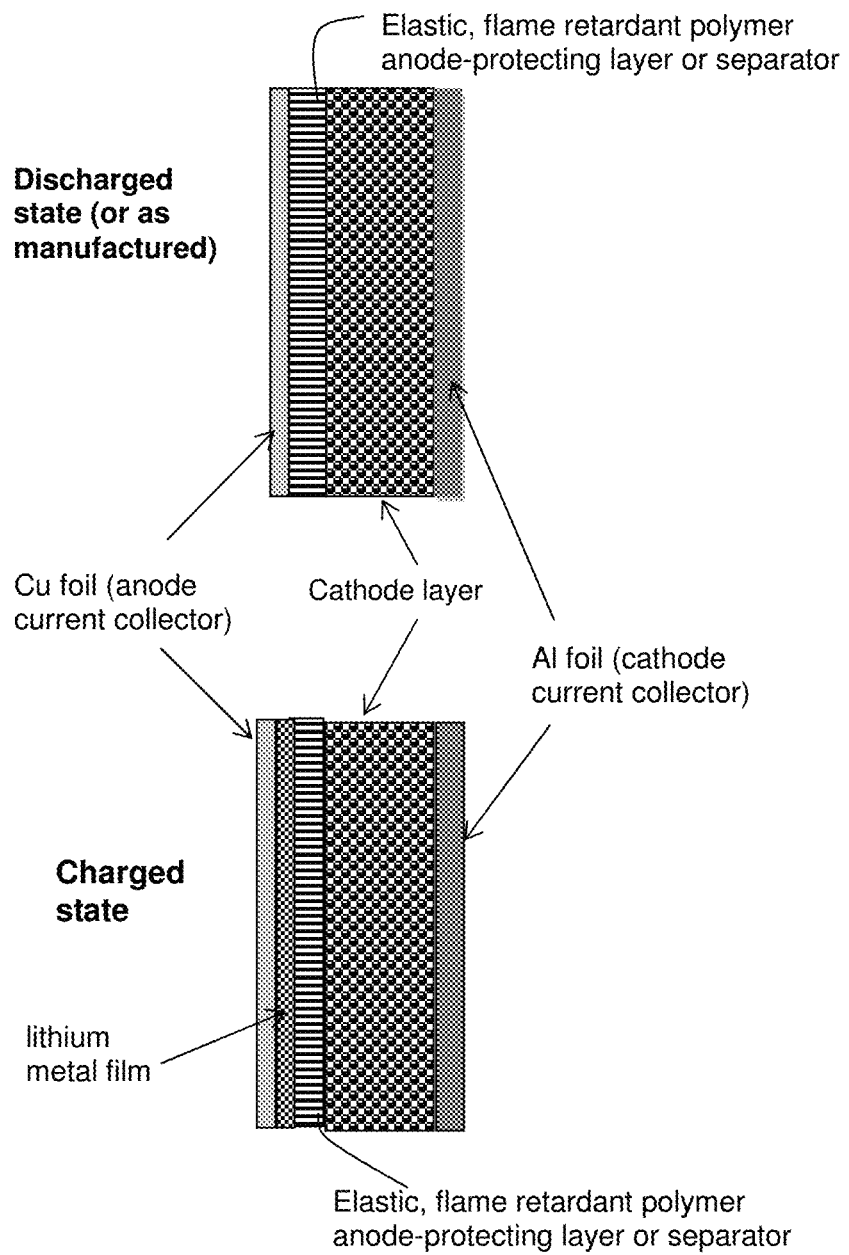
FIG. 2 Schematic of a presently invented lithium metal battery cell (upper diagram) containing an anode current collector (e.g., Cu foil) but no anode active material (when the cell is manufactured or in a fully discharged state), an elastic polymer protective layer (also serving as a separator), and a cathode active material layer, which is composed of particles of a cathode active material, a conductive additive (not shown) and a resin binder (not shown). A cathode current collector supporting the cathode active layer is also shown. The lower diagram shows a thin lithium metal layer deposited between the Cu foil and the elastic composite separator layer when the battery is in a charged state.

As schematically shown in FIG. 2, one embodiment of the present disclosure is a lithium metal battery or lithium-ion cell containing an anode current collector (e.g., Cu foil), a high-elasticity flame-retardant polymer composite-based protective layer (also serving as a separator), and a cathode active material layer, which is composed of particles of a cathode active material, a conductive additive (not shown) and a resin binder (not shown). A cathode current collector (e.g., Al foil) supporting the cathode active layer is also shown in FIG. 2.

The high-elasticity polymer material refers to a material (polymer or polymer composite) that exhibits an elastic deformation of at least 2% when measured under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 5%, more preferably greater than 10%, further more preferably greater than 30%, and still more preferably greater than 100% (up to 500%).

It may be noted that FIG. 2 shows a lithium battery that initially does not contain a lithium foil or lithium coating at the anode (only an anode current collector, such as a Cu foil or a graphene/CNT mat) when the battery is made. The needed lithium to be bounced back and forth between the anode and the cathode is initially stored in the cathode active material (e.g., lithium vanadium oxide $Li_xV_2O_5$, instead of vanadium oxide, $V_2O_5$; or lithium polysulfide, instead of sulfur). During the first charging procedure of such an anode-less lithium battery (e.g., as part of the electrochemical formation process), lithium comes out of the cathode active material, passes through the elastic composite separator and deposits on the anode current collector. The presence of the presently invented high-elasticity polymer protective layer or separator (in good contact with the current collector) enables the uniform deposition of lithium ions on the anode current collector surface. Such a battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as $Li_xV_2O_5$ and $Li_2S_x$, makes all the materials safe to handle in a real manufacturing environment. Cathode active materials, such as $Li_xV_2O_5$ and $Li_2S_x$, are typically not air-sensitive.

As the charging procedure continues, more lithium ions get to deposit onto the anode current collector, forming a lithium metal film or coating. During the subsequent discharge procedure, this lithium film or coating layer decreases in thickness due to dissolution of lithium into the electrolyte to become lithium ions, possibly creating a gap between the current collector and the separator layer if the separator layer were not elastic (e.g., a ceramic separator). Such a gap would make the re-deposition of lithium ions back to the anode impossible during a subsequent recharge procedure. We have observed that the presently invented elastic polymer protective layer is capable of expanding or shrinking congruently or conformably with the anode layer. This capability helps to maintain a good contact between the current collector (or the lithium film subsequently or initially deposited on the current collector surface) and the protective layer, enabling the re-deposition of lithium ions without interruption.

Figure 3A:
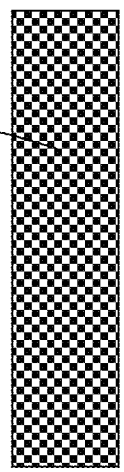
FIG. 3(A) Schematic of an elastic polymer protective layer wherein the flame retardant and/or inorganic solid electrolyte particles are uniformly dispersed in a matrix of high-elasticity polymer according to some embodiments of the present disclosure.
Figure 3B:
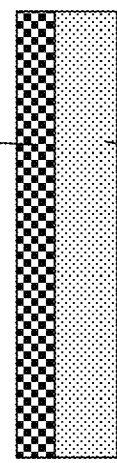
FIG. 3(B) Schematic of an elastic polymer protective layer wherein the flame retardant and/or inorganic solid electrolyte particles are preferentially dispersed near one surface (e.g. facing the anode side) of an elastic polymer protective layer; the opposing surface has a lower or zero concentration of the flame retardant and/or inorganic solid electrolyte particles, according to some embodiments of the present disclosure.

FIG. 3(A) schematically shows an elastic polymer protective layer wherein the flame retardant additive and the optional inorganic solid electrolyte particles are uniformly dispersed in a matrix of an elastic polymer according to some embodiments of the present disclosure. According to some other embodiments of the present disclosure, FIG. 3(B) schematically shows an elastic polymer composite layer wherein the flame retardant additive and/or inorganic solid electrolyte particles are preferentially dispersed near one surface (e.g. facing the anode side) of an elastic composite separator layer; the opposing surface has a lower or zero concentration of the inorganic solid electrolyte particles. This latter structure has the advantages that the high-concentration portion, being strong and rigid, provides a lithium dendrite-stopping capability while other portion of the layer remains highly elastic to maintain good contacts with neighboring layers (e.g., cathode active material layer containing a solid electrolyte on one side and lithium metal on the other) for reduced interfacial impedance. The elastic flame retardant composite separator also acts to retard the flame or fight any internal thermal runaway issue.

It may be noted that the disclosed polyphosphazene polymer per se is a good flame retardant. However, additional flame-retardant additives may be added to further enhance the battery's ability to inhibit or the internal thermal runaway and combustion processes by interfering with the various mechanisms involved—heating, ignition, and propagation of thermal degradation battery ingredients. The flame retardant additive may be selected from a halogenated flame retardant, phosphorus-based flame retardant, melamine flame retardant, metal hydroxide flame retardant, silicon-based flame retardant, phosphate flame retardant, biomolecular flame retardant, or a combination thereof.

There is no limitation on the type of flame retardant that can be physically or chemically incorporated into the elastic polymer. The main families of flame retardants are based on compounds containing: Halogens (Bromine and Chlorine), Phosphorus, Nitrogen, Intumescent Systems, Minerals (based on aluminum and magnesium), and others (e.g., Borax, $Sb_2O_3$, and nanocomposites). Antimony trioxide is a good choice, but other forms of antimony such as the pentoxide and sodium antimonate may also be used.

One may use the reactive types (being chemically bonded to or becoming part of the polymer structure) and additive types (simply dispersed in the polymer matrix). For instance, reactive polysiloxane can chemically react with EPDM type elastic polymer and become part of the crosslinked network polymer. It may be noted that flame-retarding group modified polysiloxane itself is an elastic polymer composite containing a flame reatardant according to an embodiment of instant disclosure. Both reactive and additive types of flame retardants can be further separated into several different classes:

1) Minerals: Examples include aluminum hydroxide (ATH), magnesium hydroxide (MDH), huntite and hydromagnesite, various hydrates, red phosphorus and boron compounds (e.g. borates).
2) Organo-halogen compounds: This class includes organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA), and hexabromocyclododecane (HBCD).
3) Organophosphorus compounds: This class includes organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminum diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl) phosphate (chlorinated tris or TDCPP) and tetrakis(2-chlorethyl) dichloroisopentyldiphosphate (V6).
4) Organic compounds such as carboxylic acid and dicarboxylic acid The mineral flame retardants mainly act as additive flame retardants and do not become chemically attached to the surrounding system (the polymer). Most of the organohalogen and organophosphate compounds also do not react permanently to attach themselves into the polymer. Certain new non halogenated products, with reactive and non-emissive characteristics have been commercially available as well.

In certain embodiments, the flame retardant additive is in a form of encapsulated particles comprising the additive encapsulated by a shell of coating material that is breakable or meltable when exposed to a temperature higher than a threshold temperature (e.g., flame or fire temperature induced by internal shorting). The encapsulating material is a substantially lithium ion-impermeable and liquid electrolyte-impermeable coating material. The encapsulating or micro-droplet formation processes that can be used to produce protected flame-retardant particles are briefly described below.

Several composite droplet forming processes require the encapsulating polymer or its precursor (monomer or oligomer) to be dissolvable in a solvent. Fortunately, there are a wide variety of polymers or their precursors used herein are soluble in some common solvents or water; water being the preferred liquid solvent. The un-cured polymer or its precursor can be readily dissolved in a common organic solvent or water to form a solution. This solution can then be used to embed, immerse, engulf or encapsulate the solid particles (e.g., flame retardant aluminum hydroxide particles and magnesium hydroxide particles) via several of the micro-droplet-forming methods to be discussed in what follows. Upon formation of the droplets, the polymer matrix is then polymerized and cross-linked.

There are three broad categories of micro-encapsulation methods that can be implemented to produce polymer-encapsulated flame retardant: physical methods, physico-chemical methods, and chemical methods. The physical methods include extrusion and pelletizing, solution dipping and drying, suspension coating or casting on a solid substrate (e.g. slot-die coating, Comma coating, spray-coating) followed by drying and scratching off particles from the substrate, pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

It may be noted that some of these methods (e.g. pan-coating, air-suspension coating, and spray-drying) may be used to coat or encapsulate particles by adjusting the solid content, degree of dispersion, spraying and drying conditions, etc.

The elastic polymer protective layer may comprise an inorganic filler dispersed in the high-elasticity polymer matrix wherein the inorganic filler is preferably selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof. The transition metal is preferably selected from Ti, V, Cr, Mn, Fe, Co, Ni, Cu, Zn, Y, Zr, Nb, Mo, Pd, Ag, Cd, La, Ta, W, Pt, Au, Hg, a combination thereof. Particularly desired metal oxide particles include $Al_2O_3$ and $SiO_2$.

In certain preferred embodiments, the inorganic filler comprises fine particles of a solid-state electrolyte made into a powder form. Preferably, the inorganic solid electrolyte material (to be added into the elastic polymer protective layer as a lithium ion conductivity enhancer and a lithium dendrite stopper) is in a fine powder form having a particle size preferably from 10 nm to 30 μm (more preferably from 50 nm to 1 μm). The inorganic solid electrolyte material may be selected from an oxide type (e.g., perovskite-type), sulfide type, hydride type, halide type, borate type, phosphate type, lithium phosphorus oxynitride (LiPON), Garnet-type, lithium superionic conductor (LISICON), sodium superionic conductor (NASICON), or a combination thereof.

The inorganic solid electrolytes that can be incorporated into an elastic polymer protective layer include, but are not limited to, perovskite-type, NASICON-type, garnet-type and sulfide-type materials. A representative perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a braod series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02\times10^{-3}$ S/cm at room temperature.

The sulfide-type solid electrolytes include the $Li_2S$—$SiS_2$ system. The highest reported conductivity in this type of material is $6.9\times10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an elastic polymer can help stop the penetration of lithium dendrites (if present) and enhance the lithium ion conductivity of certain elastic polymers having an intrinsically low ion conductivity.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. The high-elasticity polymer protective layer may be a polymer matrix composite containing from 1% to 95% (preferably 10% to 85%) by weight of lithium ion-conducting solid electrolyte particles dispersed in or bonded by a high-elasticity polymer matrix material.

The high-elasticity polymer should have a high elasticity (elastic deformation strain value >5%). An elastic deformation is a deformation that is fully recoverable and the recovery process is essentially instantaneous (no significant time delay). The high-elasticity polymer can exhibit an elastic deformation from 5% up to 1,000% (10 times of its original length), more typically from 10% to 700%, and further more typically from 50% to 500%, and most typically and desirably from 70% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Typically, a high-elasticity polymer is originally in a monomer or oligomer state that can be cured to form a cross-linked polymer that is highly elastic. Prior to curing, these polymers or oligomers are soluble in an organic solvent to form a polymer solution. An ion-conducting or flame retardant additive may be added to this solution to form a suspension. This solution or suspension can then be formed into a thin layer of polymer precursor on a surface of an anode current collector. The polymer precursor (oligomer or monomer and initiator) is then polymerized and cured to form a lightly cross-linked polymer. This thin layer of polymer may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and electrolyte or separator. Polymer layer formation can be accomplished by using one of several procedures well-known in the art; e.g., spraying, spray-painting, printing, coating, extrusion-based film-forming, casting, etc.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, Mc=ρRT/Ge, where Ge is the equilibrium modulus as determined by a temperature sweep in dynamic mechanical analysis, ρ is the physical density, R is the universal gas constant in J/mol*K and T is absolute temperature in K. Once Ge and ρ are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Mc and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer may contain a simultaneous interpenetrating network (SPIN) polymer, wherein two cross-linking chains intertwine with each other, or a semi-interpenetrating network polymer (semi-IPN), which contains a cross-linked polymer and a linear polymer.

The aforementioned high-elasticity polymers may be used alone to protect the lithium foil/coating layer at the anode. Alternatively, the high-elasticity polymer can be mixed with a broad array of elastomers, electrically conducting polymers, lithium ion-conducting materials, and/or strengthening materials (e.g., carbon nanotube, carbon nano-fiber, or graphene sheets).

A broad array of elastomers can be mixed with a high-elasticity polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually includes two types of domains, soft domains and hard ones. Entangled linear backbone chains including poly (tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones In some embodiments, the high-elasticity polymer can be mixed with a lithium ion-conducting additive, which contains a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroethyl-phosphate (LiPF$_3$(CF$_2$CF$_3$)$_3$), lithium bisperfluoro-ethylsulfonylimide (LiBETI), lithium bis(fluorosulfonyl)imide, an ionic liquid-based lithium salt, or a combination thereof.

In some embodiments, the high-elasticity polymer can be mixed with a lithium ion-conducting additive, which contains a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In some embodiments, the high-elasticity polymer may form a mixture, co-polymer, semi-interpenetrating network, or simultaneous interpenetrating network with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a derivative thereof (e.g. sulfonated versions), or a combination thereof.

The cathode active material may be selected from an inorganic material, an organic material, a polymeric material, or a combination thereof. The inorganic material may be selected from sulfur, selenium, a metal oxide, metal phosphate, metal silicide, metal selenide (e.g. lithium polyselides for use in a Li—Se cell), metal sulfide (e.g. lithium polysulfide for use in a Li—S cell), or a combination thereof. Preferably, these cathode active materials contain lithium in their structures; otherwise the cathode should contain a lithium source.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

The cathode active material layer may contain a metal oxide containing vanadium oxide selected from the group consisting of $Li_xVO_2$, $Li_xV_2O_5$, $Li_xV_3O_8$, $Li_xV_3O_7$, $Li_xV_4O_9$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound borate compound $LiMBO_3$, or a combination thereof, wherein M is a transition metal or a mixture of multiple transition metals.

The working electrolyte used in the lithium battery may be a liquid electrolyte, polymer gel electrolyte, solid-state electrolyte (including solid polymer electrolyte, inorganic electrolyte, and composite electrolyte), quasi-solid electrolyte, ionic liquid electrolyte.

The liquid electrolyte or polymer gel electrolyte typically comprises a lithium salt dissolved in an organic solvent or ionic liquid solvent. There is no particular restriction on the types of lithium salt or solvent that can be used in practicing the present disclosures. Some particularly useful lithium salts are lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methane-sulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroethyl-phosphate ($LiPF_3(CF_2CF_3)_3$), lithium bisperfluoro-ethylsulfonylimide (LiBETI), lithium bis(fluorosulfonyl)imide, an ionic liquid-based lithium salt, or a combination thereof.

There are a wide variety of processes that can be used to produce layers of elastic polymer protective layers. These include coating, casting, painting, spraying (e.g., ultrasonic spraying), spray coating, printing (screen printing, 3D printing, etc.), tape casting, etc.

In certain embodiments, the process for manufacturing elastic polymer protective layers comprises (A) dispersing the optional flame retardant additive and optional particles of the inorganic solid electrolyte particles in a liquid reactive mass of an elastic polymer precursor (phosphazene compound, etc.) to form a slurry; (B) dispensing and depositing a layer of the liquid reactive mass or slurry onto a solid substrate surface; and (C) polymerizing and/or curing the reactive mass to form a layer of elastic polymer.

The solid substrate may be an anode current collector, an anode active material layer, or a cathode active material layer. In other words, this elastic composite separator can be directly deposited onto a layer of anode active material, an anode current collector, or a layer of cathode active material. This is achievable because curing of the high-elasticity polymer does not require a high temperature; curing temperature typically lower than 300° C. or even lower than 100° C. This is in stark contrast to the typically 900-1,200° C. required of sintering an inorganic solid electrolyte to form a ceramic separator. In addition, the presently disclosed elastic separator is at least as good as a ceramic separator in terms of reducing interfacial impedance and stopping dendrite penetration.

Preferably, the process is a roll-to-roll process wherein step (B) comprises (i) continuously feeding a layer of the solid substrate (e.g. flexible metal film, plastic film, etc.) from a feeder roller to a dispensing zone where the reactive mass is dispensed and deposited onto the solid substrate to form a continuous layer of the reactive mass; (ii) moving the layer of the reactive mass into a reacting zone where the reactive mass is exposed to heat, ultraviolet (UV) light, or high-energy radiation to polymerize and/or cure the reactive mass to form a continuous layer of elastic polymer; and (iii) collecting the elastic polymer on a winding roller. This process is conducted in a reel-to-reel manner.

Figure 4:
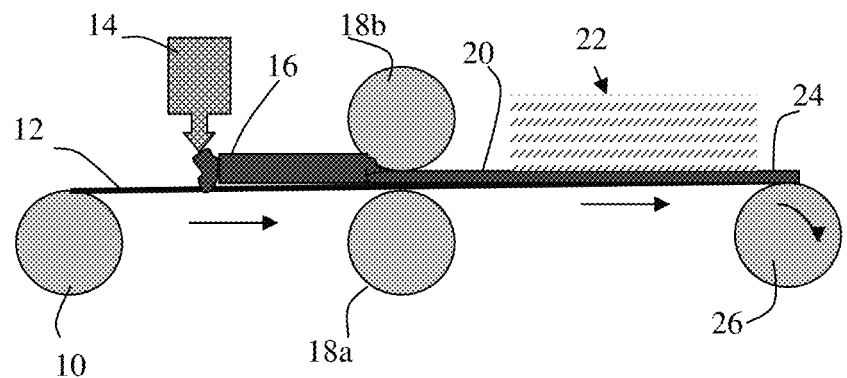
FIG. 4 Schematic of a roll-to-roll process for producing rolls of elastic composite separator in a continuous manner.

In certain embodiments, as illustrated in FIG. 4, the roll-to-roll process may begin with continuously feeding a solid substrate layer 12 (e.g., PET film) from a feeder roller 10. A dispensing device 14 is operated to dispense and deposit a reactive mass 16 (e.g., reactive slurry) onto the solid substrate layer 12, which is driven toward a pair of rollers (18a, 18b). These rollers are an example of a provision to regulate or control the thickness of the reactive mass 20. The reactive mass 20, supported on the solid substrate, is driven to move through a reacting zone 22 which is provided with a curing means (heat, UV, high energy radiation, etc.). The partially or fully cured polymer composite 24 is collected on a winding roller 26. One may unwind the roll at a later stage.

The process may further comprise cutting and trimming the layer of elastic polymer into one or multiple pieces of elastic polymer protective layers.

The process may further comprise combining an anode, the elastic polymer protective layer, an electrolyte, and a cathode electrode to form a lithium battery.

The lithium battery may be a lithium metal battery, lithium-ion battery, lithium-sulfur battery, lithium-selenium battery, lithium-air battery, etc. The cathode active material in the lithium-sulfur battery may comprise sulfur or lithium polysulfide.

Example 1: Anode Protecting Layer Based on the General Formula $[—NP(A)a(B)b-]_x$ In a representative procedure, a 1-liter flask equipped with a thermometer, a stirrer, a dropping funnel and a condenser was charged with 58.0 g (0.167 mole) of hexachlorotriphosphazene, 50 ml of toluene and 158 g (2.0 moles) of pyridine, and the mixture was stirred. To the mixture was dropwise added 143 g (1.1 moles) of 2-hydroxyethyl methacrylate (HEMA) through the dropping funnel. The mixture was heated to 60° C. and the reaction was continued for 8 hours with stirring. After precipitated crystalline materials were filtered off, the solvent in the filtrate was distilled off under reduced pressures. The residual solution was dried to a desired level, leaving 136 g (yield: 91%) of a curable phosphazene compound in the form of a solution having a yellow color.

A benzol peroxide initiator (0.5% by weight) was added to the curable phosphazene compound in toluene to produce solution No. 1. A lithium salt, lithium hexafluorophosphate ($LiPF_6$), was dissolved in fluoroethylene carbonate (FEC) to form a 1.0 M solution (Solution No. 2). The lithium salt amount was varied to result in a final lithium salt-to-polyphophazene ratio from 5/100 to 25/100. Solution No. 1 and Solution No. 2 were then mixed, well stirred, and cast onto a glass surface to form reactive layers, which were cured and dried at 60° C. overnight. A protective layer was then laminated between a Cu foil and a separator for use in an anode-less lithium battery (initially the cell being lithium-free) containing a NCM-532 cathode. Another protective layer was disposed between a Cu foil-supported lithium metal foil and a separator in a lithium-sulfur cell.

Example 2: Anode Protecting Layer Based on the General Formula [—NP(A)a(B)b-]$_x$ A 1-liter flask equipped with a thermometer, a stirrer, a dropping funnel and a condenser was charged with 100 ml of tetrahydrofuran and 11.6 g (0.5 mole) of metallic sodium. To this mixture was dropwise added 55.5 g (0.55 mole) of 2,2,2-trifluoroethanol, and the mixture was then reacted under reflux until sodium was completely consumed. To this reaction mixture was dropwise added a solution of 39.6 g (0.111 mole) of hexachlorotriphosphazene in 100 ml of toluene, and the mixture was reacted under reflux for 2 hours. Thereafter, the temperature of the reaction mixture was dropped to room temperature and 191 g (1.47 mole) of HEMA was dropwise added to the reaction mixture slowly using the dropping funnel. The mixture was then heated to 60° C. and the reaction was continued for 8 hours at that temperature with stirring. Thereafter, precipitated crystalline materials and the catalyst were filtered off and the solvent in the filtrate was distilled off under reduced pressure. The residual solution was dried to a sufficient level, leaving 88 g (yield: 93%) of a curable phosphazene compound in the form of a solution having a yellow color.

A benzol peroxide initiator (0.5% by weight), lithium bis(oxalato)borate (LiBOB), and curable phosphazene compound (ratio of 0.5/10/100) were dispersed in a mixture of vinylene carbonate (VC) and toluene to form a 1.0 M solution. The solution was directly cast over a graphene-modified Cu foil surface to form a reactive layer. Most (>80%) of the solvents were removed with the assistance of a vacuum pump. The reactive mass was cured at 65° C. overnight. Two types of battery cells were studied in this example: a lithium/NCM-811 cell (initially the cell being lithium-free at the anode side) and a lithium/NCA cathode (initially lithium-free at the anode).

Example 3: Anode Protective Layers Based on Poly [bis(2-hydroxyethyl-methacrylate)-phosphazene] and poly[(2-hydroxyethyl-methacrylate)-graft-poly(lactic-acid)-phosphazene]

Poly[bis(2-hydroxyethyl-methacrylate)-phosphazene] was obtained by nucleophilic condensation reactions at different concentrations of the substituents. Specifically, the scheme of the poly(organophosphazenes) synthesis by nucleophilic substitution is shown in Reaction 1 earlier. The single substituted and co-substituted poly(dichlorophosphazenes) (PZs) were obtained from poly(dichlorophosphazene), which was produced by melt ring-opening polymerization of hexachlorocyclotriphosphazene (HCCP) under vacuum at 250° C. for 3 h. After this time, the polymer was dissolved at room temperature in anhydrous THF, and it was separated by precipitation into n-heptane.

The substitution of poly(dichlorophosphazene) (PZ) with pentaerythritol triacrylate (PEATA) was made at two molar ratios: 1:3 and 1:6 mmol PZ-PEATA. Triethylamine (TEA) was added at 1:1 mmol ratio PEATA: TEA as effective acceptor to trap hydrogen chloride. The PZ was dissolved in THF (10 mL) under stifling, after 10 min PEATA and TEA were added and the glass vial reactor was kept for two days at room temperature. The product was purified following the procedure described for PZ.

A methyl amine initiator (0.5% by weight), lithium bis(oxalato)borate (LiBOB), and curable phosphazene compound (ratio of 0.5/10/100) were dispersed in a mixture of vinylene carbonate (VC) and toluene to form a 1.0 M solution. The solution was cast onto a glass surface. Most (>80%) of the solvents were removed with the assistance of a vacuum pump. The resin was cured at 65° C. overnight. Three types of battery cells were studied in this example: a lithium/NCM-811 cell (initially the cell being lithium-free), a Si/NCM-811 cell, and a lithium-sulfur cell.

Example 4: 2,2,4,4,6,6-Hexakis(vinyloxyethylenoxy)-2,2,4,4,6,6-hexahydro-1,3,5,2,4,6-triazatriphosphorine The compound 2,2,4,4,6,6-Hexakis(vinyloxyethylenoxy)-2,2,4,4,6,6-hexahydro-1,3,5,2,4,6- triazatriphosphorine is prepared by the following reactions:

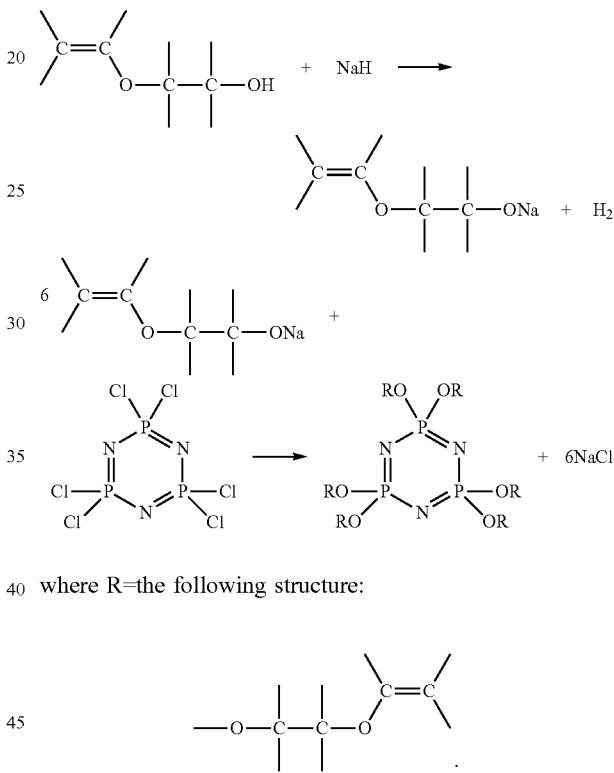

where R=the following structure:

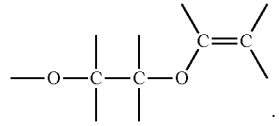

In a representative procedure, 16.80 g (0.10 mole) of sodium hydride (95%) was suspended in 700 ml of anhydrous THF and/or argon in a 2-liter three-necked flask with internal thermometer, dropping funnel, and reflux condenser. While cooling in an ice bath, 61.67 g (0.70 mole) of ethylene glycol mono-vinyl ether was then added slowly through a dropping funnel over a period of 90 min. Stirring was then continued at about 50° C. for a total of 20 h. The contents of the flask gradually exhibited a brown color.

Subsequently, a solution of 34.79 g (0.10) mole of phosphonitrile chloride (NPCl$_2$)$_3$ in 200 ml of anhydrous THF was added slowly (90 min) through a dropping funnel. Water bath cooling was necessary during this addition to keep the temperature below 30° C. Stirring was continued for 1 h at room temperature, and the batch was then heated to an internal temperature of 50° C. Stirring was continued overnight (total 24 h) at this temperature.

The mixture was then allowed to cool to room temperature and was filtered by suction. Almost all of the THF was removed from the brown filtrate in a rotary evaporator; 250 ml of diethyl ether and 250 ml of deionized water were added, and the mixture was transferred to a separatory funnel. The ether phase was separated, and the aqueous phase was extracted two more times with 125 ml portions of diethyl ether. The combined ether phases were shaken three times with 50 ml portions of deionized water, which can lighten the mixture considerably. The ether phase was separated and dried over sodium sulfate. After filtering off the drying agent and evaporating the solvent in a rotary evaporator, 62.84 g of a clear yellow liquid was obtained. The product may be further purified if so desired. The product is readily soluble in chloroform, tetrahydrofuran, diethyl ether, isopropanol, ethyl acetate, and toluene. The phosphazene derivatives herein produced, along with an optional lithium salt (e.g., 10% lithium borofluoride (LiBF$_4$) or lithium trifluoro-methanesulfonate (LiCF$_3$SO$_3$)) were then dissolved in solvents, such as ethyl acetate (EA), fluoroethylene carbonate (FEC), and hydrofluoroether (HFE), to produce precursor or reactive liquid compositions.

The reactive liquid compositions were cast over a Cu foil surface, covered by a porous PE/PP membrane as a separator, and then stacked with a cathode layer of NCM-622 particles. The cell was then irradiated with electron beam at room temperature until a total dosage of 40 Gy was reached. in-situ crosslinking of the polyphosphazene polymer layer in the anode was accomplished. Crosslinked networks are capable of holding any liquid electrolyte in place, preventing any leakage issue.

Additionally, polymer films were cast on a glass surface and some of the films were subjected to the same dosage of electron beams. The room temperature lithium-ion conductivity values of the polymers (each containing approximately 10% by weight lithium salt, LiBF$_4$) were increased from approximately $3.8 \times 10^{-4}$ S/cm for un-crosslinked polymer to approximately $2.6 \times 10^{-3}$ S/cm for electron beam-cured polymers.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing a protective layer obtained by in situ curing perform very well in terms of cycling stability and the energy storage capacity and yet these cells are flame resistant and relatively safe.

Example 5: Electrolytes Containing Homo-Polymers and Copolymers From Vinyl Ether Phosphazene Derivatives Flame-resistant protective layer compositions were prepared from vinyl ether phosphazene derivative with mixed substitution according to the following reactions:

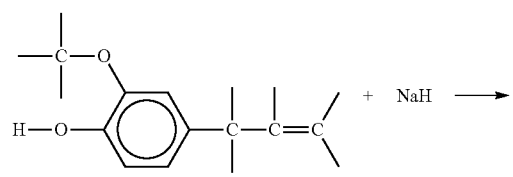

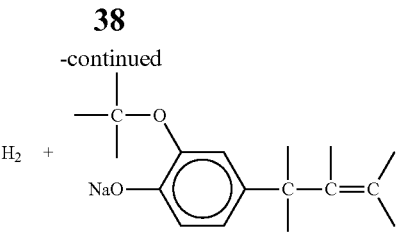

-continued

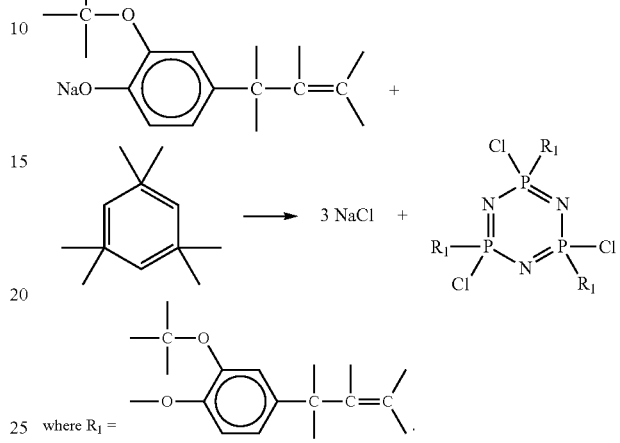

where R$_1$ =

In a representative procedure, 9.60 g (0.40 mole) of sodium hydride was placed in a 1000-ml three-necked flask with KPG stirrer, dropping funnel, and internal thermometer, and was slurred with 100 ml of anhydrous tetrahydrofuran. While cooling with ice/salt, a solution of 65.68 g (0.40 mole) of eugenol in 50 ml of anhydrous tetrahydrofuran (THF) was then added dropwise (gas evolution, addition time 45 min). Stirring was continued for 1 h at room temperature, and then a solution of 46.36 g (0.133 mole) of (NPCl$_2$)$_3$ in 150 ml of anhydrous THF was added.

The mixture was stirred for 60 h at room temperature, transferred to a single-necked flask, and the solvent is evaporated by rotation. The product was taken up in 150 ml of diethyl ether and 150 ml of deionized water, and the phases were separated in a separatory funnel. The aqueous phase was washed twice with 10 ml portions of deionized water. The combined orange-colored ether phases were dried over anhydrous sodium sulfate. The drying agent was filtered off and the clear filtrate was stirred for 30 min at room temperature with activated charcoal. After repeated filtration and solvent removal by rotary evaporation, 94 g of a viscous, clear, brown-colored liquid was obtained. The product may be further filtered through a short silica gel column if so desired. The product has a molecular weight 730.89 g/mole and is readily soluble in toluene, chloroform, ethyl acetate, diethyl ether, tetrahydrofuran, and acetone, etc.

The vinyl ether phosphazene derivatives herein produced, along with a lithium salt (e.g., 10% lithium borofluoride (LiBF$_4$)), were then dissolved in a solvent, such as ethyl acetate (EA), fluoroethylene carbonate (FEC), and hydrofluoroether (HFE), to produce precursor or reactive compositions for protective layers. In several samples, a garnet-type solid electrolyte (Li$_7$La$_3$Zr$_2$O$_{12}$ (LLZO) powder) was added into the protective layers.

Example 6: Polyphosphazene Protective Layers Were Prepared From [NPCl$_2$]$_n$ and a Propylene Oxide Oligomer The polyphosphazene polymer was prepared from [NPCl$_2$]$_n$ and a propylene oxide oligomer according to the following reaction:

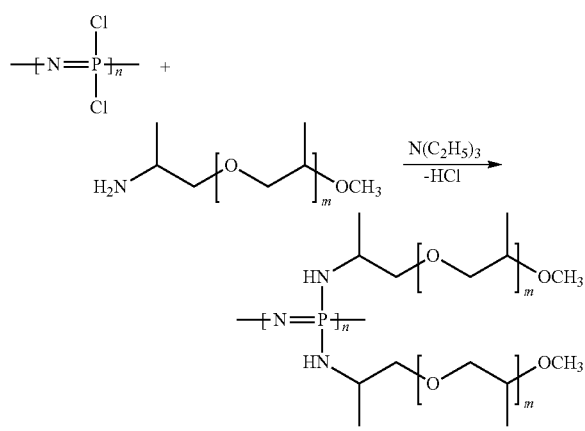

In a representative procedure, 4.69 g of [NPCl$_2$]$_n$ were dissolved in 200 ml of anhydrous THF to form a polymer solution. Then 11.3 ml of triethyl amine (TEA) and 50 ml of propylene oxide oligomer were then added to the polymer solution. The resulting reaction mixture was stirred for 24 h at room temperature. The solvent was then removed under vacuum yielding a highly viscous yellowish polymer solution which was dialyzed against water for 5 days. Removal of water after dialysis yielded a slightly yellowish, highly viscous polymer.

The substituted polyphosphazene, 15% by weight of lithium hexafluorophosphate (LiPF$_6$), and 0.5% by weight of benzophenone as photoinitiator were then dispersed/dissolved in a 50/50 solvent mixture of fluoroethylene carbonate (FEC) and vinylene carbonate (VC) to form a solution. The slurry was coated on a surface of Cu foil to form a protective layer, which was exposed to UV light for 20 minutes to induce crosslinking reaction.

The anode, separator, and cathode layers were then stacked together and encased by a protective housing to make a battery cell.

Several tensile testing specimens were cut from each cross-linked film and tested with a universal testing machine. The representative tensile stress-strain curves indicate that this series of network polymers have an elastic deformation from approximately 28% (high PAA content) to 415%. These above are for neat polymers without any additive.

For electrochemical testing, the working electrodes (cathode layers) were prepared by mixing 85 wt. % LiV$_2$O$_5$ or 88% of graphene-embraced LiV$_2$O$_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi \le 12$ mm) and dried at 100° C. for 24 h in vacuum.

Electrochemical measurements were conducted on cells that are initially lithium metal-free and cells that contain a lithium foil. In the former cells (anode-less cells), a Cu foil coated with an elastic polymer protective layer, a porous PE-PP separator, and a cathode layer were combined to form a cell, which was injected with an electrolyte solution containing 1 M LiPF$_6$ dissolved in a mixture of ethylene carbonate (EC) and diethyl carbonate (DEC) (EC-DEC, 1:1 v/v). The cell assembly was performed in an argon-filled glove-box. For comparison purposes, cells with the conventional Celgard 2400 membrane (porous PE-PP film) as a separator, but no elastic polymer protective layer, were also prepared. The CV measurements were carried out using a CH-6 electrochemical workstation at a scanning rate of 1-100 mV/s. The electrochemical performance of the cell featuring the elastic composite separator and that containing a conventional separator were evaluated by galvanostatic charge/discharge cycling at a current density of 50 mA/g using an Arbin electrochemical workstation.

The specific intercalation capacity curves of two lithium cells each having a cathode containing LiV$_2$O$_5$ particles (one cell having a flame retardant-filled cross-linked polymer-based separator and the other having no protection, just a conventional separator) were obtained and compared. As the number of cycles increases, the specific capacity of the un-protected cells drops at a very fast rate. In contrast, the presently invented cross-linked polymer-based protection layer provides the battery cell with a significantly more stable and high specific capacity for a large number of cycles. These data have demonstrated the surprising and superior performance of the presently invented cross-linked polymer protection approach.

The high-elasticity cross-linked polymer protective layer appears to be capable of reversibly deforming to a great extent without breakage when the lithium foil decreases in thickness during battery discharge. The elastic polymer protective layer also prevents the continued reaction between liquid electrolyte and lithium metal at the anode, reducing the problem of continuing loss in lithium and electrolyte. This also enables a significantly more uniform deposition of lithium ions upon returning from the cathode during a battery re-charge; hence, no lithium dendrite.

I claim:

1. A lithium secondary battery comprising a cathode, an anode, an elastic polymer protective layer disposed between the cathode and the anode, and a working electrolyte in ionic communication with the anode and the cathode, wherein said elastic polymer protective layer comprises a high-elasticity polymer, has a thickness from 2 nm to 200 μm, a lithium ion conductivity from $10^{-8}$ S/cm to $5 \times 10^{-2}$ S/cm at room temperature, said high-elasticity polymer has a fully recoverable tensile elastic strain of at least 5% when measured without any additive or filler dispersed therein and wherein said high-elasticity polymer comprises a cross-linked polymer network of chains derived from a phosphazene compound and wherein said crosslinked polymer network of chains is impregnated with from 0% to 90% by weight of a lithium salt, a non-aqueous liquid solvent, or a liquid electrolyte comprising a lithium salt dissolved in a non-aqueous liquid solvent.

2. The lithium secondary battery of claim 1, further comprising an ion-conducting and electrically insulating separator disposed between the elastic polymer protective layer and the cathode.

3. The lithium secondary battery of claim 1, wherein the battery is a lithium metal battery and the anode has an anode current collector but initially the anode has no lithium or lithium alloy as an anode active material supported by said anode current collector when the battery is made and prior to a charge or discharge operation of the battery.

4. The lithium secondary battery of claim 1, wherein the high-elasticity polymer further comprises a flame-retardant additive or particles of an inorganic solid electrolyte.

5. The lithium secondary battery of claim 1, wherein the polymer comprises a polyphosphazene selected from the groups consisting of (a) linear polymers having the formula (N=PR$^1$R$^2$)$_n$, where R$^1$ and R$^2$ are organic groups, and n is an integer; (b) cyclolinear and cyclomatrix polymers in which phosphazene rings are connected together by organic chain units; (c) block copolymer, star, dendritic, or comb-type structures; and combinations thereof.

6. The lithium secondary battery of claim 1, wherein the phosphazene compound is synthesized from a precursor monomer, oligomer, or reactive polymer selected from Chemical formula 1, Chemical formula 2, Chemical formula 3, Chemical formula 4, or a combination thereof:

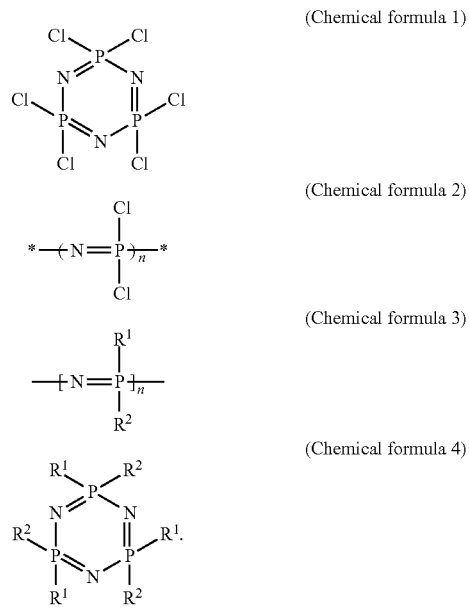

wherein $R^1$ and $R^2$ are independently selected from an organic group or an organometallic group, and n is an integer.

7. The lithium secondary battery of claim 1, wherein the phosphazene compound comprises a phosphazene derivative of the general formula: $[\text{—NP(A)a(B)b-}]_x$, wherein the groups A and B are bonded to phosphorous atoms through —O—, —S—, —NH—, or —NR—, wherein R is a $C_1$-$C_6$ alkyl group; A contains at least one of a vinyl ether group of the general formula Q—O—CR'═CHR" and a styrene ether group of the general formula:

wherein at least one of R' and R" are hydrogen or a $C_1$-$C_{10}$ alkyl group; B is a reactive or nonreactive hydrocarbon group; Q is one of an aliphatic, cycloaliphatic, aromatic, and heterocyclic hydrocarbon group; a is a number greater than 0; b is 0 or a number greater than 0; a+b=2, x stands for a whole number that is at least 2; and z stands for 0 or 1.

8. The lithium secondary battery of claim 1, wherein the phosphazene compound comprises a phosphazene derivative of the general formula: $[\text{—NP(A)a(B)b-}]_x$, wherein A and B are identical to or different from each other and independently represent a polymerization curable group containing an acryl group, a methacryl group, a vinyl group or an allyl group or a non-polymerization curable group, including a hydrogen atom, a halogen atom, a phenoxy group, a halogenated phenoxy group, an alkoxy group, a halogenated alkoxy group, an amino group, an alkylamino group, a halogenated alkylamino group or a mercapto group, wherein at least one of A and B is a polymerization curable group; a and b are independently each 0 or an integer larger than 0 and the sum of a and b is 2; and n is an integer of 3 or larger.

9. The lithium secondary battery of claim 1, wherein said high-elasticity polymer contains a cross-linked network of a phosphazene compound crosslinked by a crosslinking agent to a degree of crosslinking that imparts an elastic tensile strain from 5% to 500%.

10. The lithium secondary battery of claim 9, wherein said crosslinking agent is selected from epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, poly (acrylic acid) (PAA), a diisocyanate, an urethane chain, a chemical derivative thereof, or a combination thereof.

11. The lithium secondary battery of claim 9, wherein the polyphosphazene is crosslinked by a crosslinking agent that comprises a compound having at least one reactive group selected from a phenylene group, a hydroxyl group, an amino group, an imino group, an amide group, an amine group, an acrylic group, an acrylic ester group, or a mercapto group in the molecule.

12. The lithium secondary battery of claim 1, wherein said high-elasticity polymer further comprises from 0.1% to 95% by weight of a flame retardant additive, an inorganic filler, or both that is dispersed in, dissolved in, or chemically bonded to the high-elasticity polymer.

13. The lithium secondary battery of claim 1, wherein the battery is a lithium-ion battery and the anode has an anode current collector and a layer of an anode active material supported by said anode current collector, wherein the anode active materials is selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium aluminate, lithium-containing titanium oxide, lithium transition metal oxide, $ZnCo_2O_4$; (f) carbon or graphite particles (g) prelithiated versions thereof; and (h) combinations thereof.

14. The lithium secondary battery of claim 1, wherein said elastic polymer protective layer maintains in physical contact with an anode current collector or an anode active material layer to protect said anode current collector or said anode active material layer during a battery charge or discharge.

15. The lithium secondary battery of claim 12, wherein said flame retardant additive is selected from a halogenated flame retardant, phosphorus-based flame retardant, melamine flame retardant, metal hydroxide flame retardant, silicon-based flame retardant, biomolecular flame retardant, or a combination thereof.

16. The lithium secondary battery of claim 12, wherein said flame retardant additive is in a form of encapsulated particles comprising the additive encapsulated by a shell of a substantially lithium ion-impermeable and liquid electrolyte-impermeable coating material, wherein said shell is breakable when exposed to a temperature higher than a threshold temperature.

17. The lithium secondary battery of claim 1, wherein said working electrolyte is selected from an organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, hybrid or composite electrolyte, or a combination thereof.

18. The lithium secondary battery of claim 12, wherein said inorganic filler is selected from an oxide, carbide, boride, nitride, sulfide, phosphide, halogen compound, or selenide of a transition metal, Al, Ga, In, Sn, Pb, Sb, B, Si, Ge, Sb, or Bi, a lithiated version thereof, or a combination thereof.

19. The lithium secondary battery of claim 12, wherein said inorganic filler is selected from an inorganic solid electrolyte material in a fine powder form having a particle size from 2 nm to 30 μm.

20. The lithium secondary battery of claim 19, wherein said particles of an inorganic solid electrolyte material selected from an oxide type, sulfide type, hydride type, halide type, borate type, phosphate type, lithium phosphorus oxynitride (LiPON), garnet-type, lithium superionic conductor (LISICON) type, or a combination thereof.

21. The lithium secondary battery of claim 1, wherein said high-elasticity polymer further comprises an elastomer that forms a mixture, a copolymer, a semi-interpenetrating network, or a simultaneous interpenetrating network with said high-elasticity polymer wherein said elastomer is selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poiy(ethylene-co-octene) elastomer, poiy(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polysiloxane, polyurethane, urethane-urea copolymer, urethane-acrylic copolymer, a copolymer thereof, a sulfonated version thereof, or a combination thereof.

22. The lithium secondary battery of claim 1, wherein said high-elasticity polymer further comprises from 0.1% to 70% by weight of a lithium ion-conducting additive.

23. The lithium secondary battery of claim 22, wherein said lithium ion-conducting additive comprises a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroethyl-phosphate (LiPF$_3$(CF$_2$CF$_3$)$_3$), lithium bisperfluoro-ethylsulfonylimide (LiBETI), lithium bis(fluorosulfonyl)imide, an ionic liquid-based lithium salt, or a combination thereof.

24. The lithium secondary battery of claim 1, wherein the high-elasticity polymer forms a mixture, a blend, a copolymer, a semi-interpenetrating network, or a simultaneous interpenetrating network with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, poly(vinylidene fluoride)-hexafluoropropylene (PVDF-HFP), a sulfonated derivative thereof, or a combination thereof.

25. The lithium secondary battery of claim 1, wherein said cathode comprises a cathode active material selected from an inorganic material, an organic material, a polymeric material, or a combination thereof.

26. The lithium secondary battery of claim 25, wherein said inorganic material, as a cathode active material, is selected from sulfur, selenium, a metal oxide, metal phosphate, metal silicide, metal selenide, metal sulfide, or a combination thereof.

27. The lithium secondary battery of claim 25, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

28. The lithium secondary battery of claim 25, wherein said inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, or V; Mb is selected from Fe, Mn, Co, Ni, V, Ti, Al, B, Sn, or Bi; and x+y≤1.

29. The lithium secondary battery of claim 26, wherein said metal oxide or metal phosphate is selected from a layered compound LiMO$_2$, spinel compound LiM$_2$O$_4$, olivine compound LiMPO$_4$, silicate compound Li$_2$MSiO$_4$, Tavorite compound, borate compound LiMBO$_3$, or a combination thereof, wherein M is a transition metal or a mixture of multiple transition metals.

30. The lithium secondary battery of claim 26, wherein the cathode active material comprises lithium nickel manganese oxide (LiNi$_a$Mn$_{2-a}$O$_4$, 0<a<2), lithium nickel manganese cobalt oxide (LiNi$_n$Mn$_m$Co$_{1-n-m}$O$_2$, 0<n<1, 0<m<1, n+m<1), lithium nickel cobalt aluminum oxide (LiNi$_c$Co$_d$Al$_{1-c-d}$O$_2$, 0<c<1, 0<d<1, c+d<1), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

31. The lithium battery of claim 7, wherein the reactive or nonreactive hydrocarbon group contains at least one of O, S, and N.

32. The lithium battery of claim 7, wherein the reactive hydrocarbon group contains at least one reactive group.

33. The lithium battery of claim 7, wherein the aliphatic, cycloaliphatic, aromatic, and heterocyclic hydrocarbon group contains at least one of O, S, and N.

34. A process for manufacturing an elastic polymer protective layer, the process comprising (A) dispersing an inorganic solid electrolyte particles in a liquid reactive mass of an elastic polymer precursor to form a reactive slurry wherein said elastic polymer precursor comprises a phosphazene compound or derivative; (B) dispensing and depositing a layer of said liquid reactive mass or slurry onto a solid substrate surface; and (C) polymerizing and/or curing said reactive mass or slurry to form said elastic polymer protective layer.

35. The process of claim 34, wherein said solid substrate is an anode current collector, an anode active material layer, a separator layer, or a cathode active material layer.

36. The process of claim 34, which is a roll-to-roll process wherein said step (B) comprises (i) continuously feeding a layer of said solid substrate from a feeder roller to a dispensing zone where said reactive slurry is dispensed and deposited onto said solid substrate to form a continuous layer of said reactive slurry; (ii) moving said layer of the reactive slurry into a reacting zone where the reactive slurry is exposed to heat, ultraviolet light, or high-energy radiation to polymerize and/or crosslink said reactive mass to form a continuous layer or roll of elastic polymer; and (iii) collecting said elastic polymer on a winding roller.

37. The process of claim 36, further comprising cutting and trimming said layer or roll of elastic polymer into one or multiple pieces of elastic polymer protective layers.

38. The process of claim 35, further comprising a step of combining an anode, said elastic polymer protective layer, a working electrolyte, and a cathode electrode to form a lithium battery.

39. The process of claim 34, wherein, in addition to the inorganic solid electrolyte particles, a flame retardant additive is also dispersed in the liquid reactive mass of the elastic polymer precursor.

40. An elastic and flame retardant composite layer, wherein said elastic and flame retardant composite layer comprises a high-elasticity polymer and from 0.1% to 95% by weight of a flame retardant additive dispersed in, dissolved in, or chemically bonded to the high-elasticity polymer, wherein said composite layer has a thickness from 10 nm to 200 μm and a lithium ion conductivity from $10^{-8}$ S/cm to $5\times10^{-2}$ S/cm at room temperature and said high elasticity polymer has a fully recoverable tensile strain greater than 5% when measured without any additive dispersed therein and wherein said high-elasticity polymer comprises at least a crosslinked polymer network of chains derived from at least one phosphazene compound.

* * * * *